United States Patent [19]

Dollinger et al.

[11] Patent Number: 5,428,751
[45] Date of Patent: Jun. 27, 1995

[54] WORK STATION INCLUDING A DIRECT MEMORY ACCESS CONTROLLER AND INTERFACING MEANS TO A DATA CHANNEL

[75] Inventors: Georg Dollinger, Westendorf, Germany; Edward C. King, Fremont, Calif.

[73] Assignee: NCR Corporation, Dayton, Ohio

[21] Appl. No.: 753,273

[22] Filed: Aug. 30, 1991

[30] Foreign Application Priority Data

Aug. 31, 1990 [GB] United Kingdom ............. 9019001

[51] Int. Cl.6 ............................................ G06F 13/18
[52] U.S. Cl. ................................. 395/325; 395/800; 364/242.6; 364/242.92; 364/240
[58] Field of Search ............. 395/325, 275, 425, 725, 395/250, 550, 800

[56] References Cited

U.S. PATENT DOCUMENTS

| 4,344,132 | 8/1982 | Dixon et al. ............... | 395/250 |
|---|---|---|---|
| 4,777,591 | 10/1988 | Chang et al. ............... | 395/800 |
| 4,782,439 | 11/1988 | Borkar et al. ............... | 395/425 |
| 4,878,166 | 10/1989 | Johnson et al. ............... | 395/425 |
| 4,882,671 | 11/1989 | Graham et al. ............... | 395/425 |
| 4,891,752 | 1/1990 | Fairman et al. ............... | 395/425 |
| 4,930,069 | 5/1990 | Batra et al. ............... | 395/275 |
| 4,949,301 | 8/1990 | Joshi et al. ............... | 395/425 |
| 4,987,529 | 1/1991 | Craft et al. ............... | 395/325 |
| 4,989,113 | 1/1991 | Hull, Jr. et al. ............... | 395/425 |
| 5,003,463 | 3/1991 | Coyle et al. ............... | 395/275 |
| 5,023,465 | 3/1991 | Chisholm et al. ............... | 395/275 |
| 5,072,365 | 12/1991 | Burgess et al. ............... | 395/725 |
| 5,077,664 | 12/1991 | Taniai et al. ............... | 395/425 |
| 5,089,953 | 2/1992 | Ludicky ............... | 395/425 |
| 5,099,417 | 3/1992 | Magar et al. ............... | 395/425 |
| 5,111,425 | 5/1992 | Takeuchi et al. ............... | 395/425 |
| 5,131,083 | 7/1992 | Crawford et al. ............... | 395/275 |
| 5,151,986 | 9/1992 | Langan et al. ............... | 395/550 |
| 5,165,022 | 11/1992 | Erhard et al. ............... | 395/275 |
| 5,218,681 | 6/1993 | Gephardt et al. ............... | 395/325 |
| 5,265,228 | 11/1993 | Beaudoin et al. ............... | 395/425 |
| 5,301,282 | 4/1994 | Amini et al. ............... | 395/325 |

Primary Examiner—Allen R. MacDonald
Assistant Examiner—Tariq Hafiz
Attorney, Agent, or Firm—Douglas S. Foote

[57] ABSTRACT

A work station having a local bus connected to a CPU, and an interface chip connected between an external bus and the local bus. The buses have different operating frequencies. The interface chip includes a DMA unit and interfacing unit connected to an internal bus, The DMA unit controls data transfer between the external and local buses. The first interfacing unit includes a synchronizer for compensating for the different operating frequencies.

11 Claims, 15 Drawing Sheets

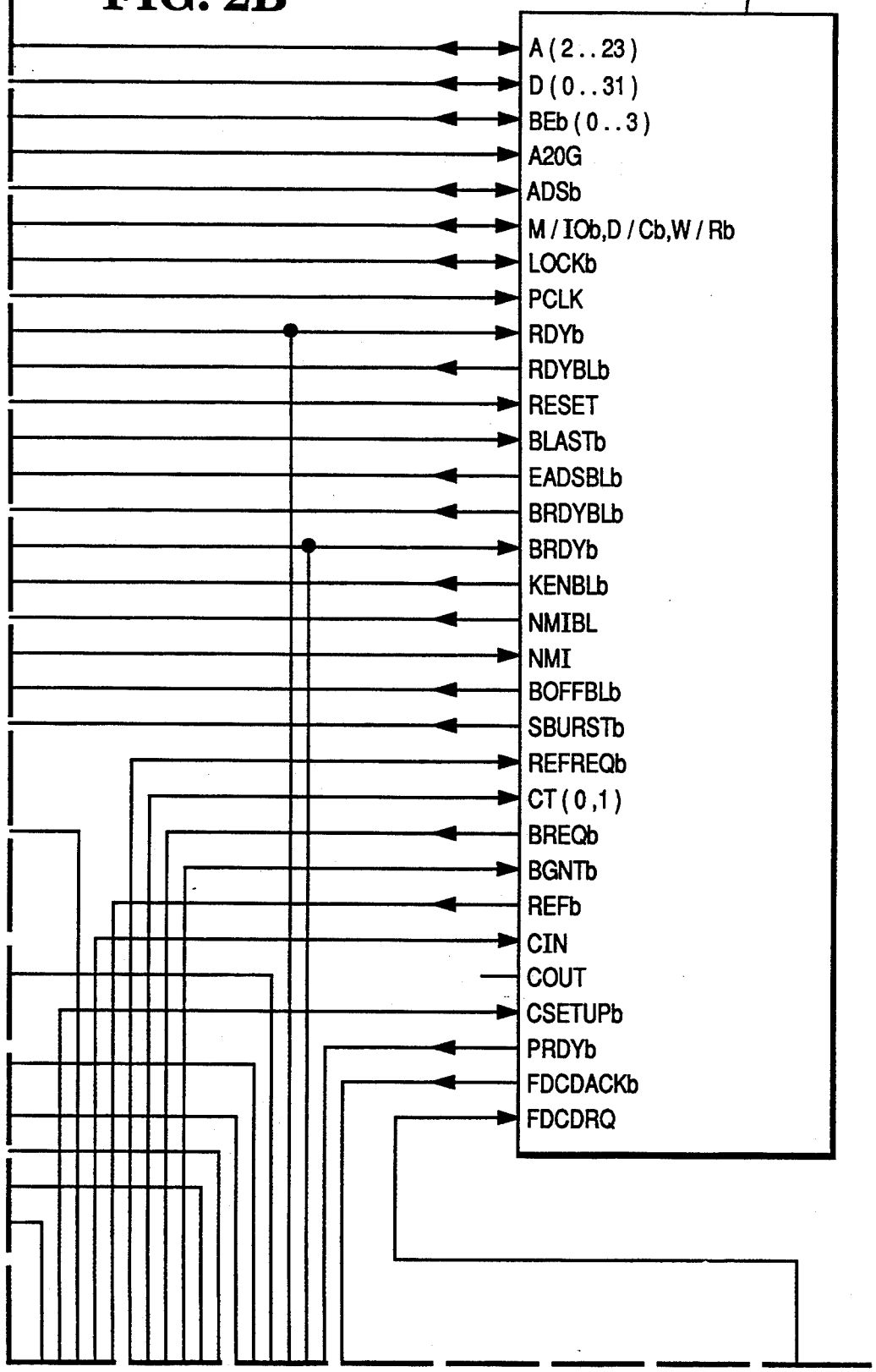

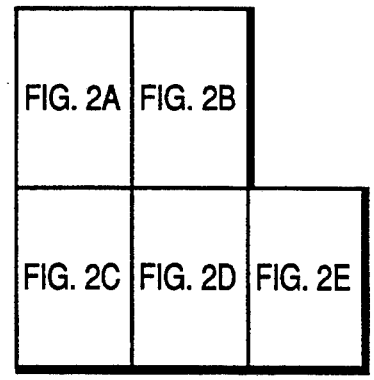
FIG. 2
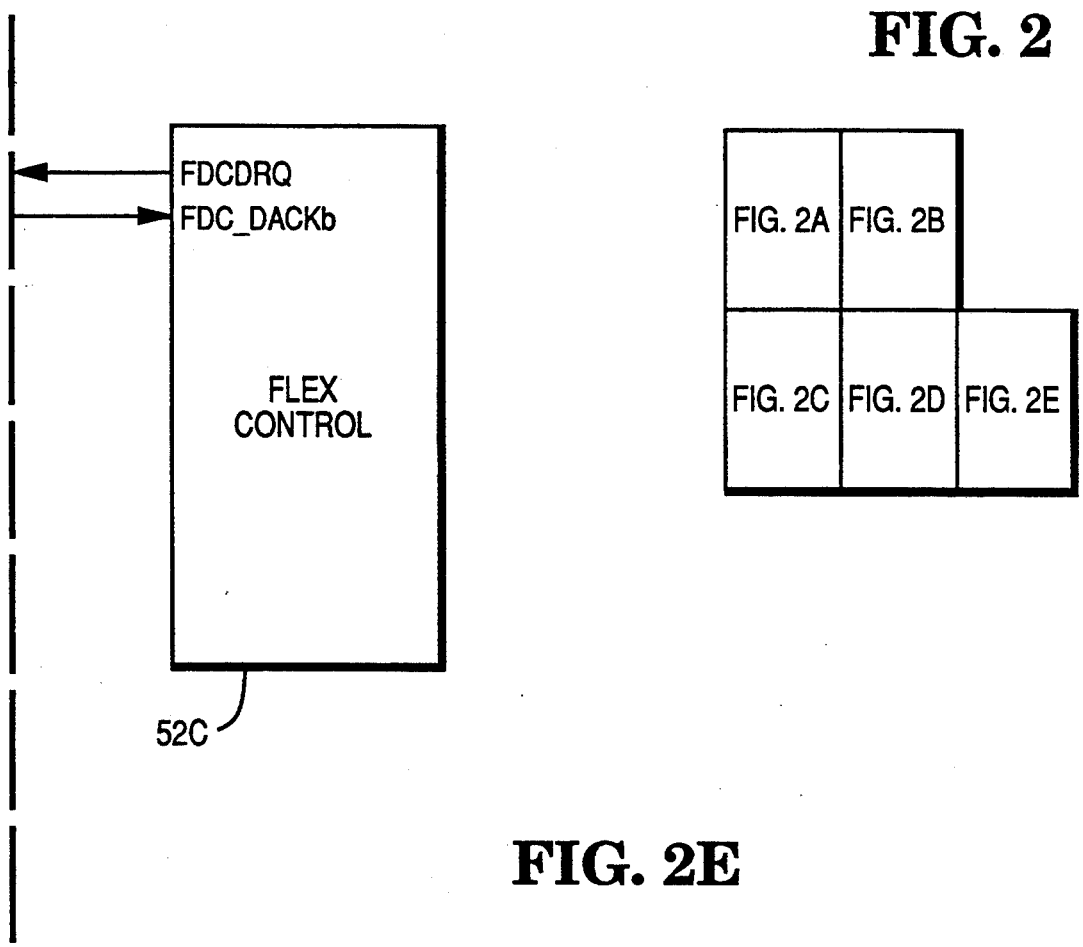
FIG. 2E
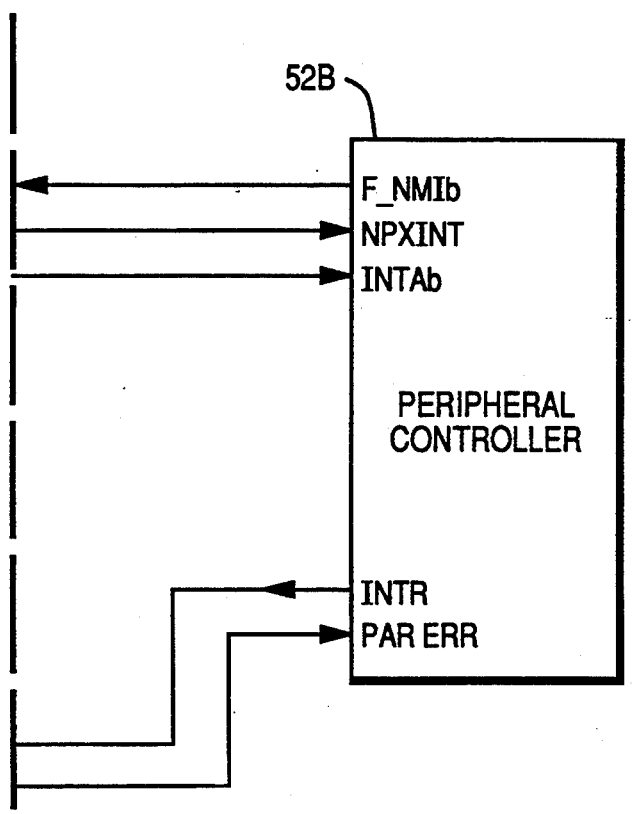

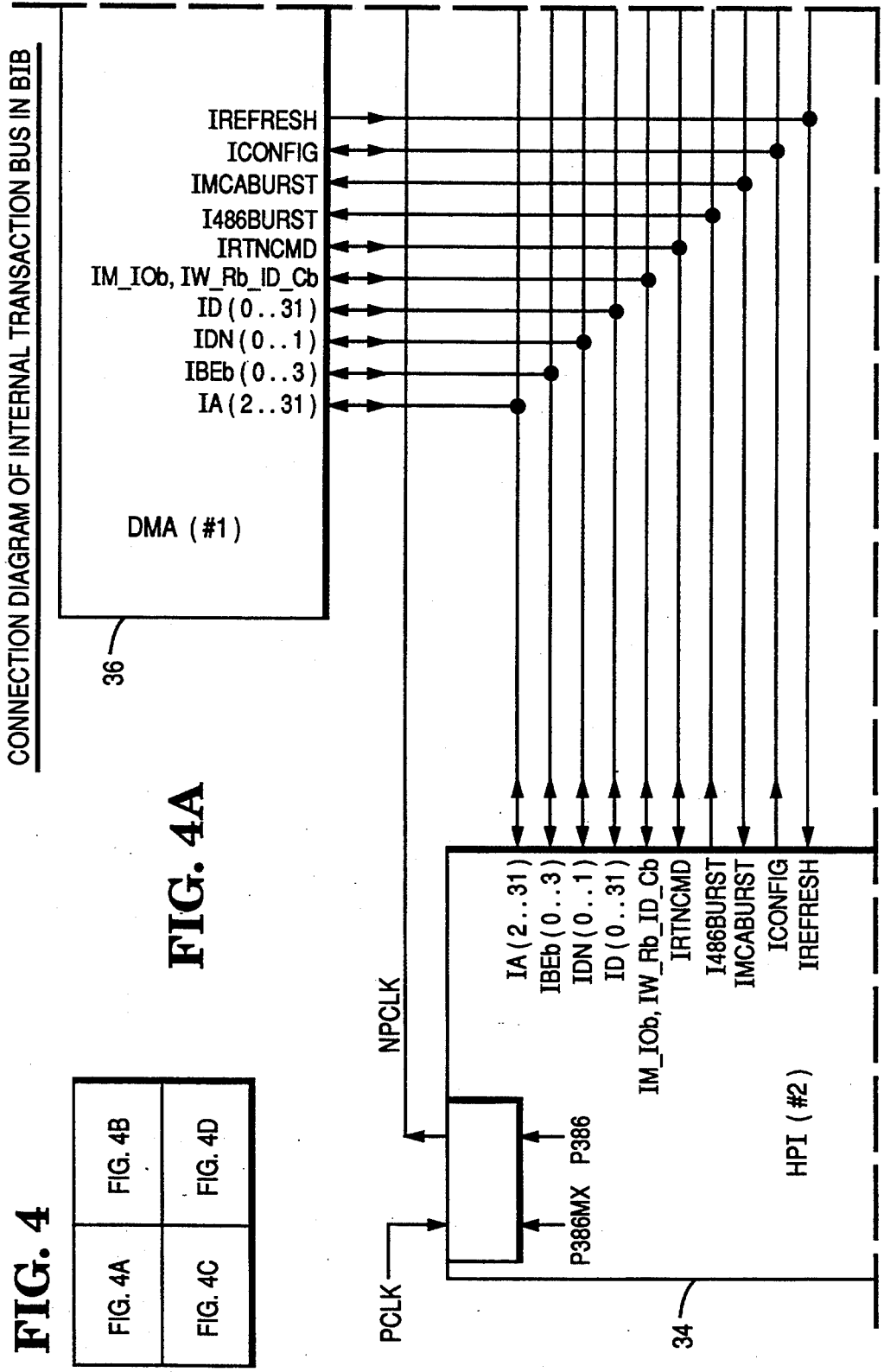

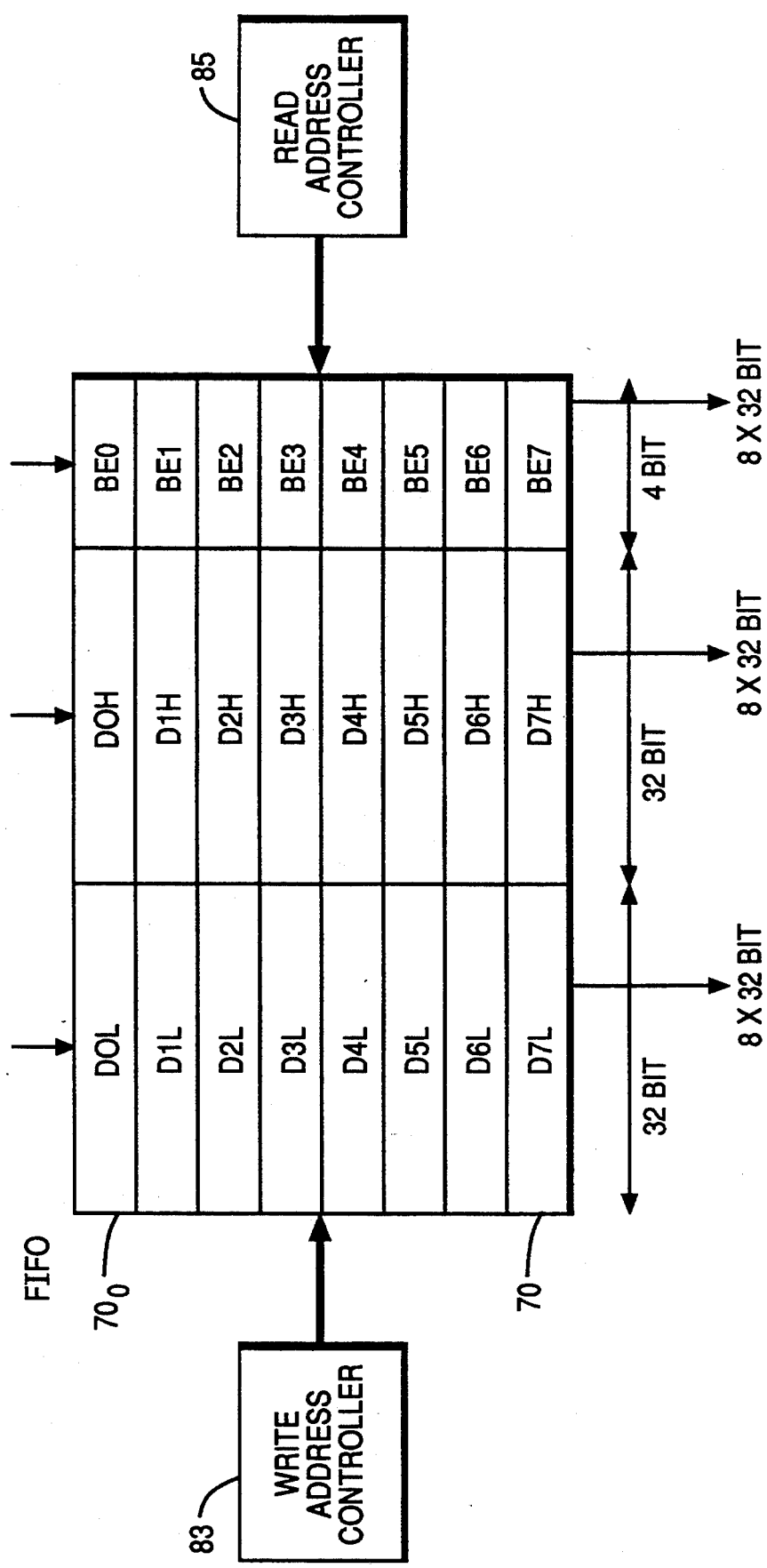

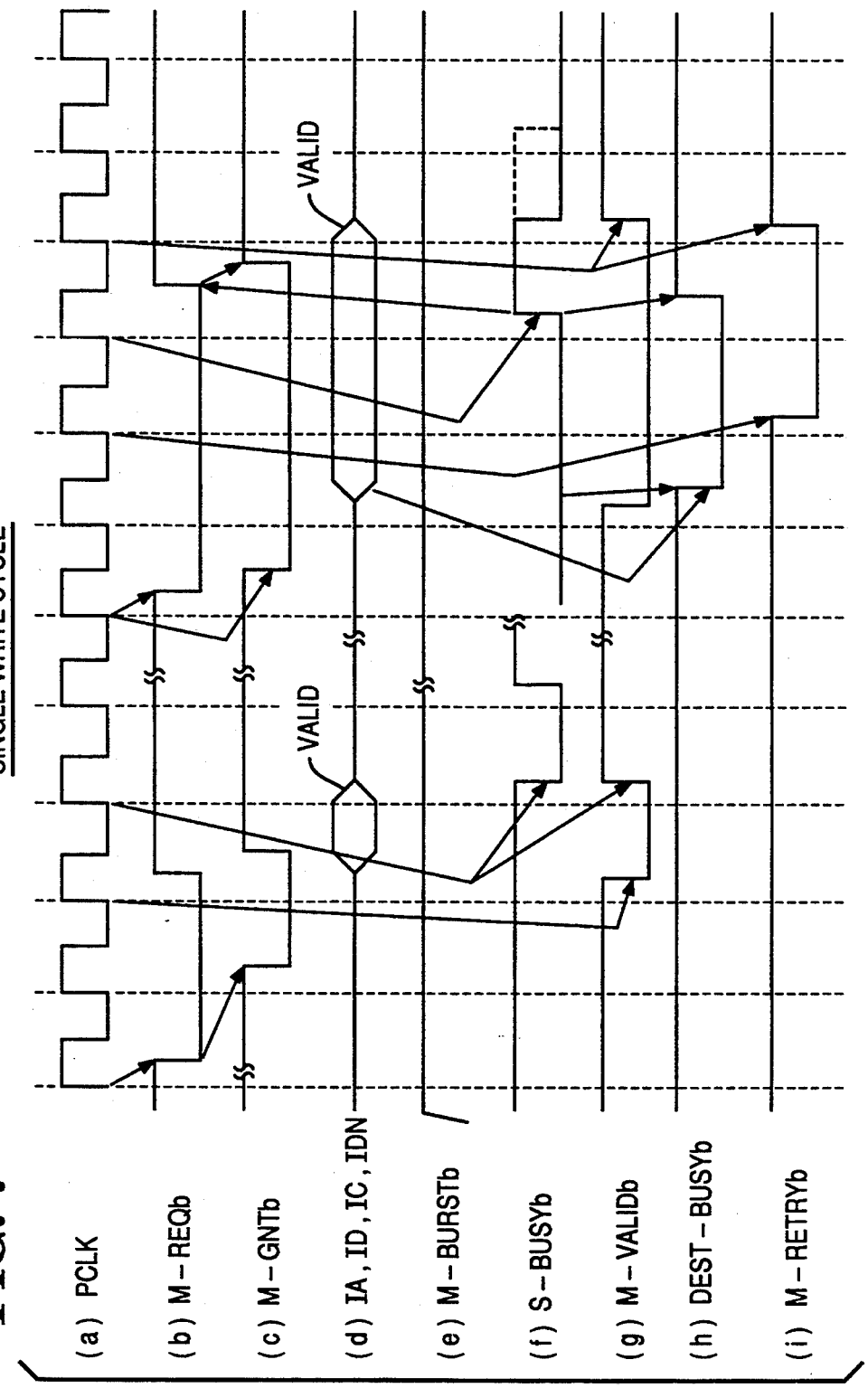

WORK STATION INCLUDING A DIRECT MEMORY ACCESS CONTROLLER AND INTERFACING MEANS TO A DATA CHANNEL

This invention relates to a work station or similar data processing system. More particularly, it relates to an architecture for such data processing system.

CROSS-REFERENCE TO RELATED APPLICATIONS

"Work Station Having Multiprocessing Capability", U.S. patent application Ser. No. 752,747 concurrently herewith, invented by Otto Duerrschmid and Edward C. King.

"Work Station or Similar Data Processing System Including Interfacing Means to Microchannel Means", U.S. patent application Ser. No. 752,710, filed concurrently herewith, invented by V. Thomas Powell, Anton Goeppel, Edward C. King and G. Roerhl.

"Work Station and Method for Configuring Thereof", U.S. patent application Ser. No. 752,814, filed concurrently herewith, invented by Anton Goeppel.

"Work Station Interfacing Means Having Burst Mode Capability", U.S. patent application Ser. No. 752,383, filed concurrently herewith, invented by Edward C. King and Anton Goeppel.

"Internal Bus for Work Station Interfacing Means", U.S. patent application Ser. No. 752,371, filed concurrently herewith, invented by Edward C. King and Anton Goeppel.

"Work Station Architecture With Selectable CPU", U.S. patent application Ser. No. 752,819, filed concurrently herewith, invented by Edward C. King and Anton Goeppel.

"Register Control for Workstation Interfacing Means", U.S. patent application Ser. No. 752,727, filed concurrently herewith, invented by Anton Goeppel.

"Work Station Having Multiplexing and Burst Mode Capabilities", U.S. patent application Ser. No. 752,407, filed concurrently herewith, invented by Anton Goeppel and Edward C. King.

"Work Station Including a Direct Memory Access Controller", U.S. patent application Ser. No. 752,815, filed concurrently herewith, invented by Anton Goeppel.

BACKGROUND OF THE INVENTION

An architectural feature of many data processing systems is a direct memory access (DMA) controller. A DMA controller is provided with CPU-type logic and is dedicated to the sole task of moving data between an external system bus and system memory. A typical DMA controller is connected to the external bus and includes the logic necessary to compensate for different operating frequencies of the external bus and system memory. For example, in a system having an external Micro Channel bus, a DMA controller may be connected to a slot on the Micro Channel. This type of DMA controller includes logical circuitry for handling data transfer, including compensation for timing and frequency differences between the CPU clock and the Micro Channel clock. Inherently, this known DMA controller is an extremely complex unit with its operation considerably influencing the overall performance of the system.

OBJECTS OF THE INVENTION

It is therefore an object of the present invention to provide a new and improved architecture for a work station.

It is another object of the present invention to provide a new and improved system for handling DMA data transfers in a work station.

It is a further object of the present invention to provide a work station having improved performance.

It is a further object of the present invention to provide a work station including a simplified DMA controller.

SUMMARY OF THE INVENTION

According to the invention there is provided a work station having a local bus connected to a CPU, and an interface chip connected between an external bus and the local bus. The buses have different operating frequencies. The interface chip includes a DMA unit and interfacing unit connected to an internal bus. The DMA unit controls data transfer between the external and local buses. The first interfacing unit includes a synchronizer for compensating for the different operating frequencies.

Thus, the functionality of the DMA and synchronizer are separated. In this manner, the DMA design is simplified and can be reused in similar designs having different timing requirements between the external and local bus.

In a preferred embodiment of the present invention, the internal bus of the interface chip enables communication between the individual operational units on the chip. Each operational unit has an identification number by which it is addressable over specific lines of the internal bus. An internal arbiter grants access to the internal transaction bus to a unit having highest priority. The internal bus operates independently of the local (host) bus but with the same frequency as the host CPU.

It should be understood that, compared with known work stations, the splitting of the functions between the DMA controller and the synchronizer provides a smooth data transfer through a compact and effectively controlled interface chip.

One embodiment of the invention will now be described by way of example with reference to the accompanying drawings.

BRIEF DESCRIPTION OF THE DRAWINGS

FIGS. 2A to 2E, arranged as shown in FIG. 2, are a schematic drawing showing in detail a host P/M bus as used to connect the various functional blocks with each other.

FIGS. 4A to 4D, arranged as shown in FIG. 4, are a schematic drawing showing in detail the various lines of an internal transaction bus of the BIB.

FIG. 6 is a schematic drawing illustrating the principal design of a buffer used with the synchronizer of FIGS. 5A–5B.

FIG. 7 is a timing diagram used for explaining operation of the work station for a single write cycle.

DESCRIPTION OF A PREFERRED EMBODIMENT

Figure 1:
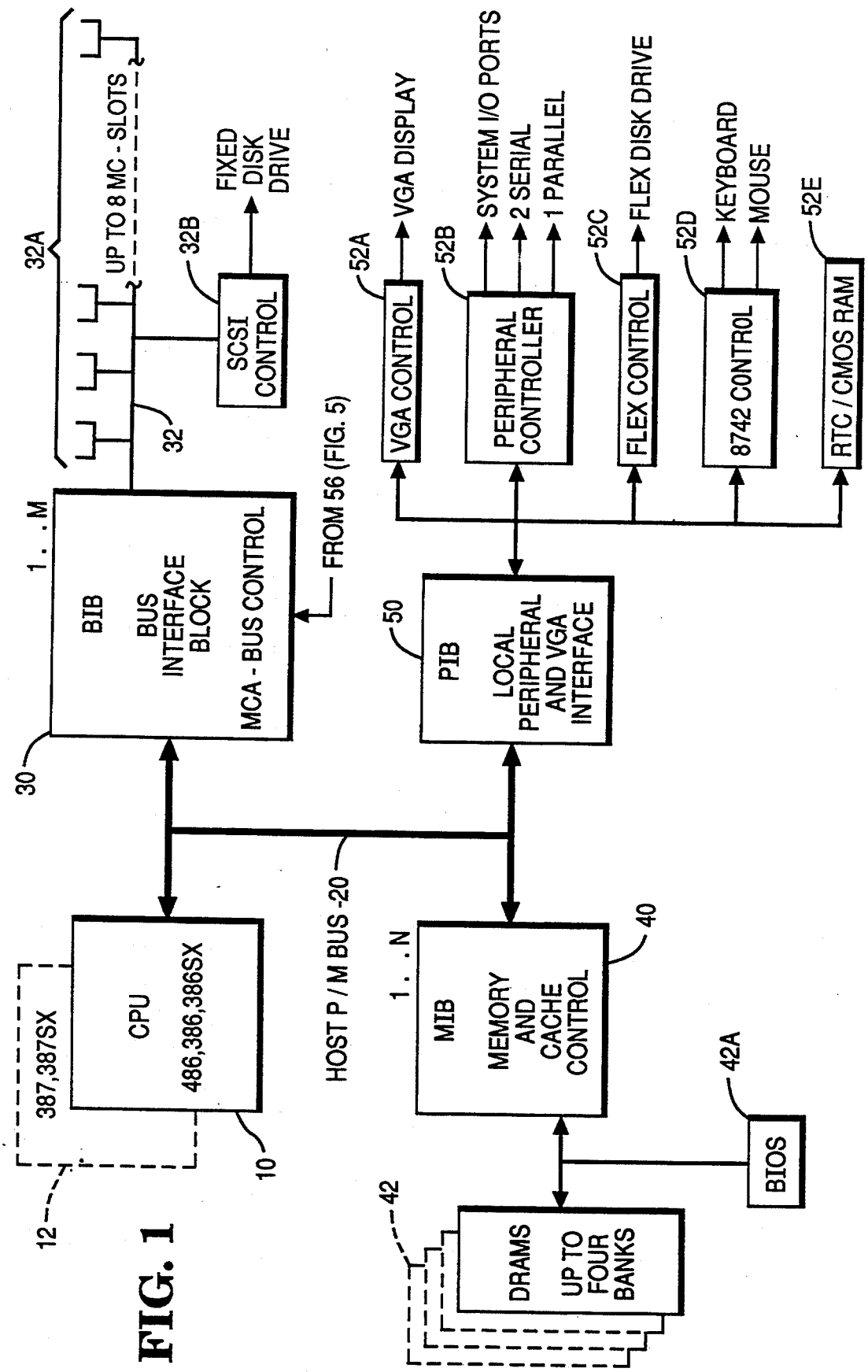
FIG. 1 is a schematic overall view of one embodiment of a work station according to the invention illustrating the various functional blocks of the work station and the connections therebetween.
Figure 2A:
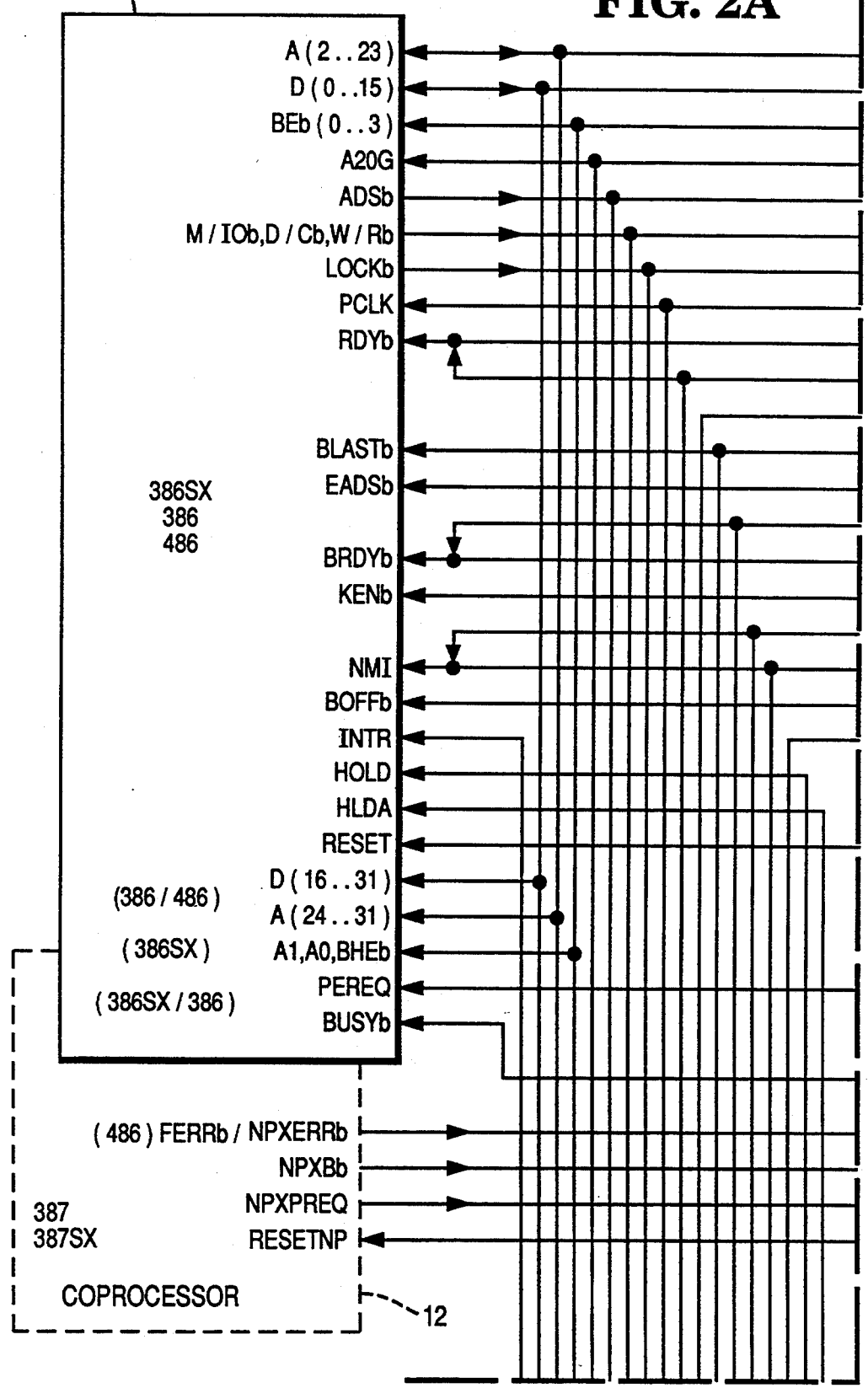
Figure 2C:
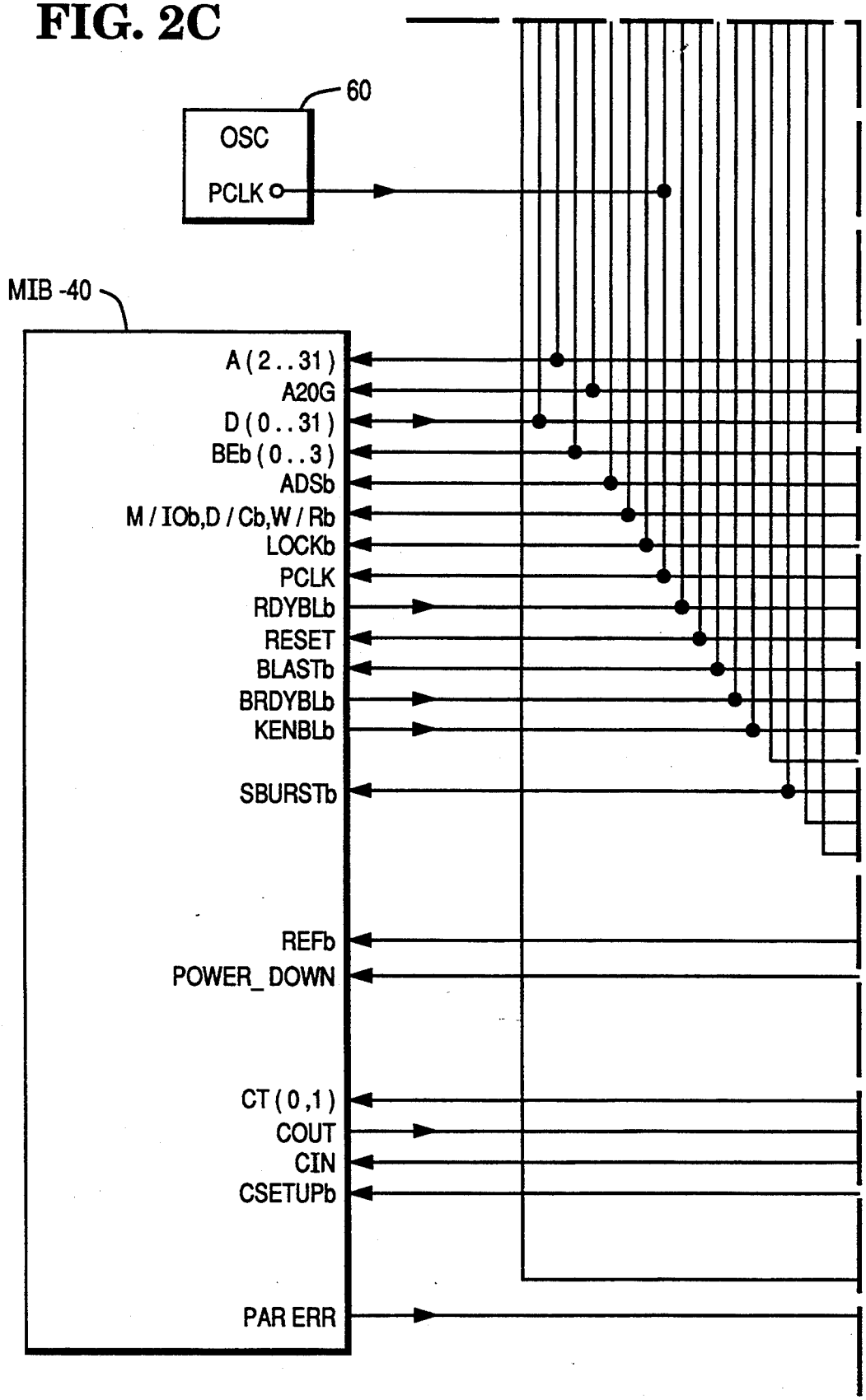
Figure 2D:
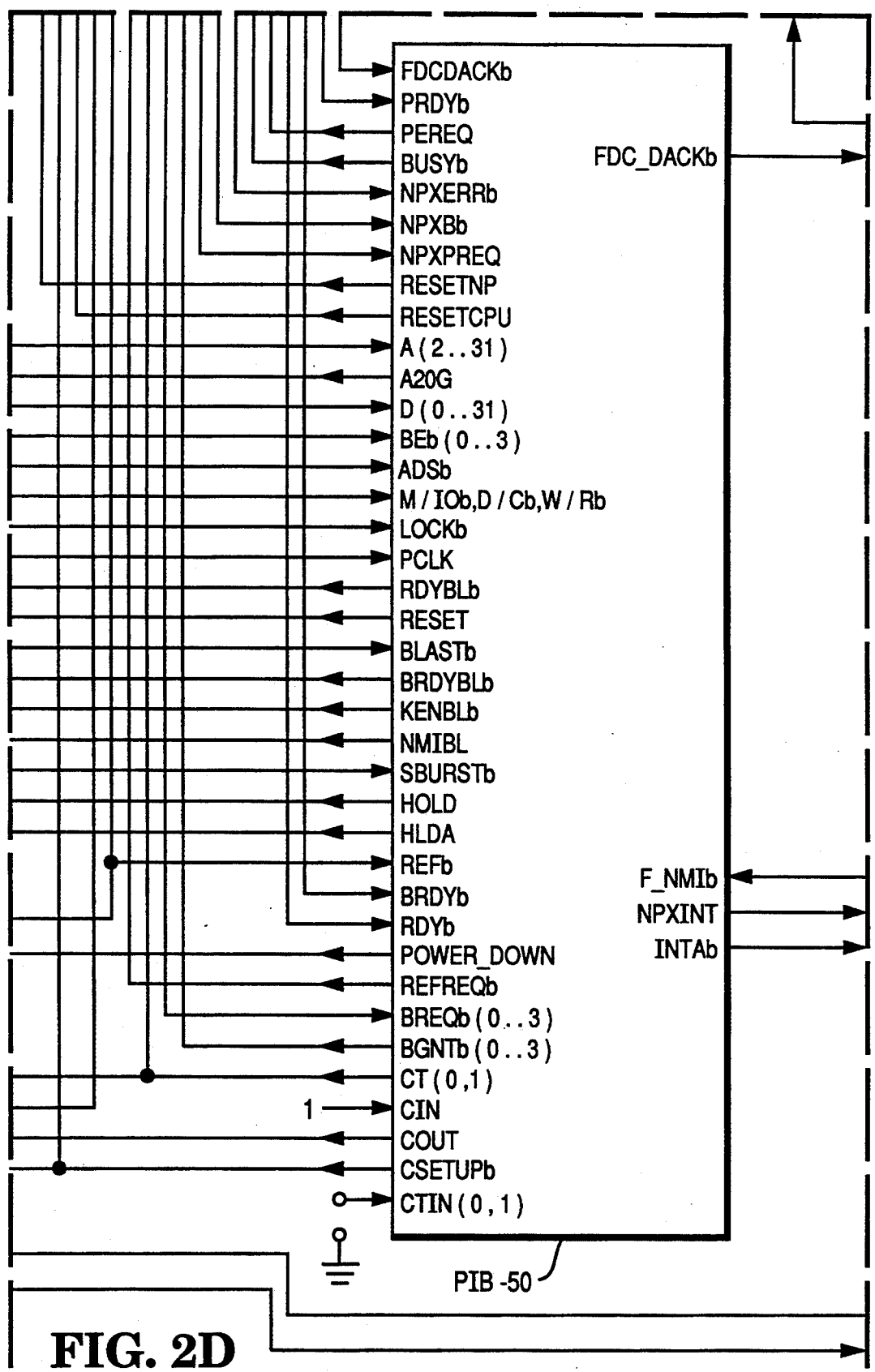

FIG. 1 shows a preferred embodiment of a work station or data processing system according to the invention.

Basically, a CPU 10 communicates through a host P/M bus 20 with functional blocks 30, 40, and 50, and in particular with one or a plurality of bus interface blocks (BIB) 30 for data channel (Micro Channel bus) access, with one or a plurality of memory interface blocks (MIB) 40 for memory and cache control, and with a local peripheral and video graphics array (VGA) interface block (PIB) 50.

It should be noted that different types of microprocessors may be used for the CPU 10, such as the Intel 80386, 80386SX, and 80486 microprocessors. Also, a coprocessor 12, such as a mathematical coprocessor Intel 80387, or 80387SX may be added.

The functional block BIB 30 is provided as an interface between the host P/M bus 20 and a Micro Channel 32 provided with a plurality of slots 32a for attaching conventional input/output devices including adapter boards provided with a microprocessor which may act as a master in communication with other functional blocks of the work station. Also, an example of an adapter board is a circuit board carrying additional memory. Furthermore, a control 32b is connected to the Micro Channel 32 for controlling a fixed disk drive.

The functional block MIB 40 forms an interface between the host P/M bus 20 and a DRAM memory 42 which may have different sizes with a presently usual size of 16 MB up to 64 MB. Furthermore, the MIB 40 controls access to the usual BIOS ROM memory 42a.

The functional peripheral interface block PIB 50 (FIG. 1) forms an interface between the host P/M bus 20 and various conventional system and peripheral units through respective control blocks. All these units are well known in the art, and therefore they will not be described in further detail.

Each of the functional blocks BIB 30, MIB 40 and PIB 50 has been specifically designed as one microchip each containing all elements such as registers and logic circuitry necessary to establish and perform communication between the host P/M bus 20 and the individual units connected to each functional block 30, 40, and 50.

As indicated in FIG. 1 it should be noted that a plurality m of BIBs 30 and a plurality n of MIBs 40 may be provided all connected to the host P/M bus 20. Thus, a large variety of configurations with different CPUs and different memory capacities may be implemented. Each chip may be configured quite differently to match various configurations of the system.

Each functional block 30, 40, 50 is provided with some intelligence providing an operation which is relatively independent of the CPU operation generally governing all functions of the system, thus relieving the CPU from controlling data transfers between the functional blocks, such as between a BIB 30 and an MIB 40, and of many other procedures. As regards the MIBs 40, these blocks will organize refresh cycles for the DRAMs and overflow cleaning of caches included therein.

Basically, each functional block 30, 40, 50 includes an interface unit between the host P/M bus and an individual internal transaction bus. Though the timing is based on the CPU clock, all operations within a functional block such as read or write operations will be independently performed in one cycle whilst the CPU would need at least two cycles of the CPU clock. Accordingly, this type of system architecture offers a considerably improved performance in view of the reduction of wait states for the CPU, resulting in a higher overall operating speed.

Figure 3:
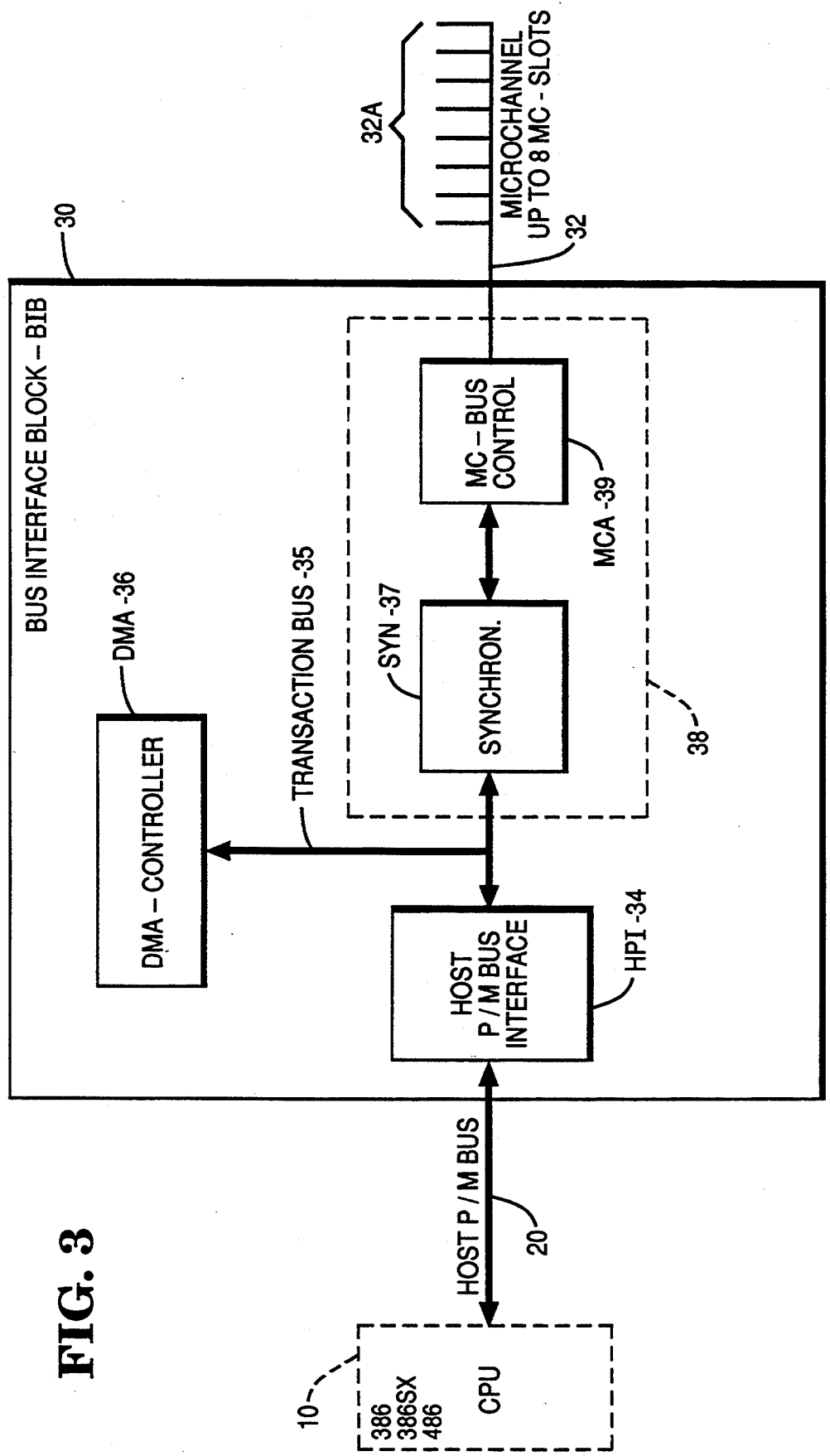
FIG. 3 is a block diagram of a bus interface block BIB.

Specifically referring to FIG. 3, the bus interface block BIB 30 shown therein comprises, preferably arranged on one microchip, a host P/M bus interface HPI 34 forming an interface between the host P/M bus 20 and an internal transaction bus 35 providing communication connections to an EMCA unit 38, which is an interfacing unit to at least one Micro Channel. The EMCA unit 38 includes a synchronizing unit SYNC 37 which is connected to an extended MCA bus controller or MCA unit 39 for access to the Micro Channel 32. Further details of the EMCA unit 38 will be explained hereafter in connection with FIGS. 5A–5B.

Further connected to the internal transaction bus 35 is a DMA controller DMA 36 for controlling data transfer between a DRAM memory 42 and the Micro Channel 32 via an MIB 40 and the host P/M bus 20.

The work station offers high flexibility in respect of using one of various types of CPUs and a plurality of Micro Channels and DRAM memory units to be included in the system. This is in contrast with known work stations where a predetermined CPU communicates with one Micro Channel and one DRAM memory block only.

A specifically extended host P/M bus is illustrated in FIGS. 2A–2E in detail. Specifically, within the block CPU 10 the conventional input/output ports of a microprocessor, such as Intel 80386, etc., are listed as address ports A(2,...23), data ports D(0,...15), byte enable ports BEb (0,...3), and an address status output ADSb which indicates that a valid bus cycle definition and address are available and which is driven active in the same clock as the addresses are driven. ADSb is active low. The system clock PCLK is generated by a clock oscillator 60 and supplied to the input port PCLK of the CPU 10 and the functional blocks BIB 30, MIB 40, and PIB 50. These and all other input/output ports of the CPU 10 and the signals presented there are conventional. Thus, they will not be explained in detail.

As may be gathered from FIGS. 2A–2E, the functional blocks BIB 30, MIB 40, and PIB 50 are provided with similar input/output ports as the CPU. However, there are several additional ports and associated bus lines connecting corresponding ports of the functional blocks and the CPU with each other such as CT (0..1) which is a combination of the two lines included in the host P/M bus indicating the type of processor (or functional block) which has access to the host P/M bus. BREQb (0...3) is a host P/M bus request signal with the assumption that four BIBs 30 may be provided each being connected with the PIB 50 by one request line. BGNTb (0...3) is a host P/M bus grant signal transmitted by the PIB 50 to one of the BIBs 30 having requested access to the host P/M bus by BREQb (0...3). SBURSTBLb is a signal generated by one of the functional blocks BIB 30 to temporarily halt the transfer in burst mode but keeping the burst condition established. CIN and COUT are input/output signals used in a system configuration routine.

Figure 4B:
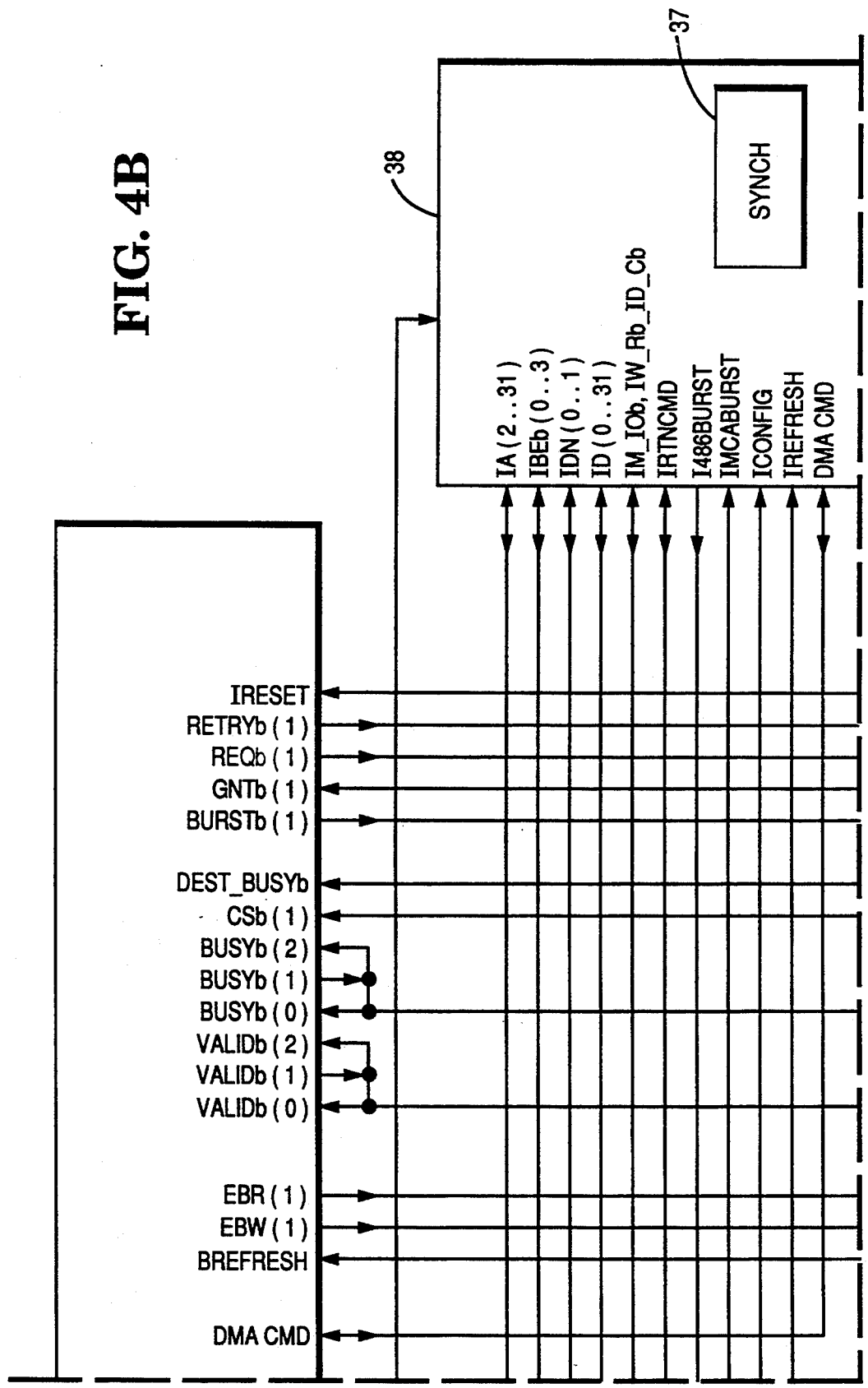

Particularly referring to FIGS. 3 and 4, the specific design of one functional block will be explained taking a BIB 30 as an example.

As mentioned before, the functional block BIB 30 basically comprises unit HPI 34, DMA controller 36, SYNC unit 37, and MCA unit 39, which according to FIGS. 4A–4D is actually combined with EMCA unit 38. These three units communicate with each other through the internal transaction bus TRACT 35 in a similar manner as the CPU 10 and the functional blocks BIB 30, MIB 40, and PIB 50.

Accordingly, the BIB 30 is a self-contained functional block performing several functions without control of the CPU 10 or another busmaster.

A comparison of FIGS. 4A–4D with FIG. 2 shows close similarities of the signals and corresponding lines on the host P/M bus and internal transaction bus 35.

Each unit 34, 36, 38 connected to the TRACT bus 35 has a VALID signal, a REQUEST signal, a GRANT signal, and a BURST signal. Each unit has an ID number according to priority with "0" the highest priority. Specifically, EMCA 38 has assigned #0, DMA 36 has assigned #1, and HPI 34 has assigned #2.

In the following Table 1 the main signals of TRACT 35 are listed.

TABLE 1

IA(2:31): Internal Address Bit 2 to 31.
IBEb(0:3): Internal Byte Enables 0 to 3.
IDN(0:1): Block ID-Number (maximum number of blocks is 4).
ID(0:31): Internal Data Bits 0 to 31.
VALIDb(n): The valid signal of the unit #n is driven by unit #n at the time when the address, data, and command on the TRACT bus 35 are valid.
BUSYb(n): The busy signal of the unit #n becomes active at that time, when the unit #n gets busy. It allows also to stop data transfer temporarily during burst mode. The burst mode remains active in that case.
REQb(n): The request signal of unit #n is driven by unit n.
GNTb(n): The grant line is driven by the internal arbiter 66.
BURSTb(n): The burst line is driven by a unit #n which currently has got a grant and wants to keep the transaction bus 35 for multiple accesses without intermission.
CSb(n): The chip select line is driven by a address decoder 64. Each functional block has its own chip select signal.
RETRYb(n): When a master unit #n tries to get access to a slave unit which is currently busy a retry signal is generated by that master. This retry signal is used to reorder the priority on the transaction bus 35.

Broadcast Signals:

NPCLK: Clock signal for all transactions on the transaction bus 35. The system's CPU 10 runs with the same clock. The reference for all cycles is the rising edge of this clock.
IRESET: Internal reset for all units 34, 36, 37.
DEST-BUSYb: Indicates that the slave unit of the current transaction bus cycle is busy.
VALIDALLb: Combination of all VALIDb signals. This signal indicates to an addressed slave unit the presence of a valid cycle on the TRACT bus.

Figure 4C:
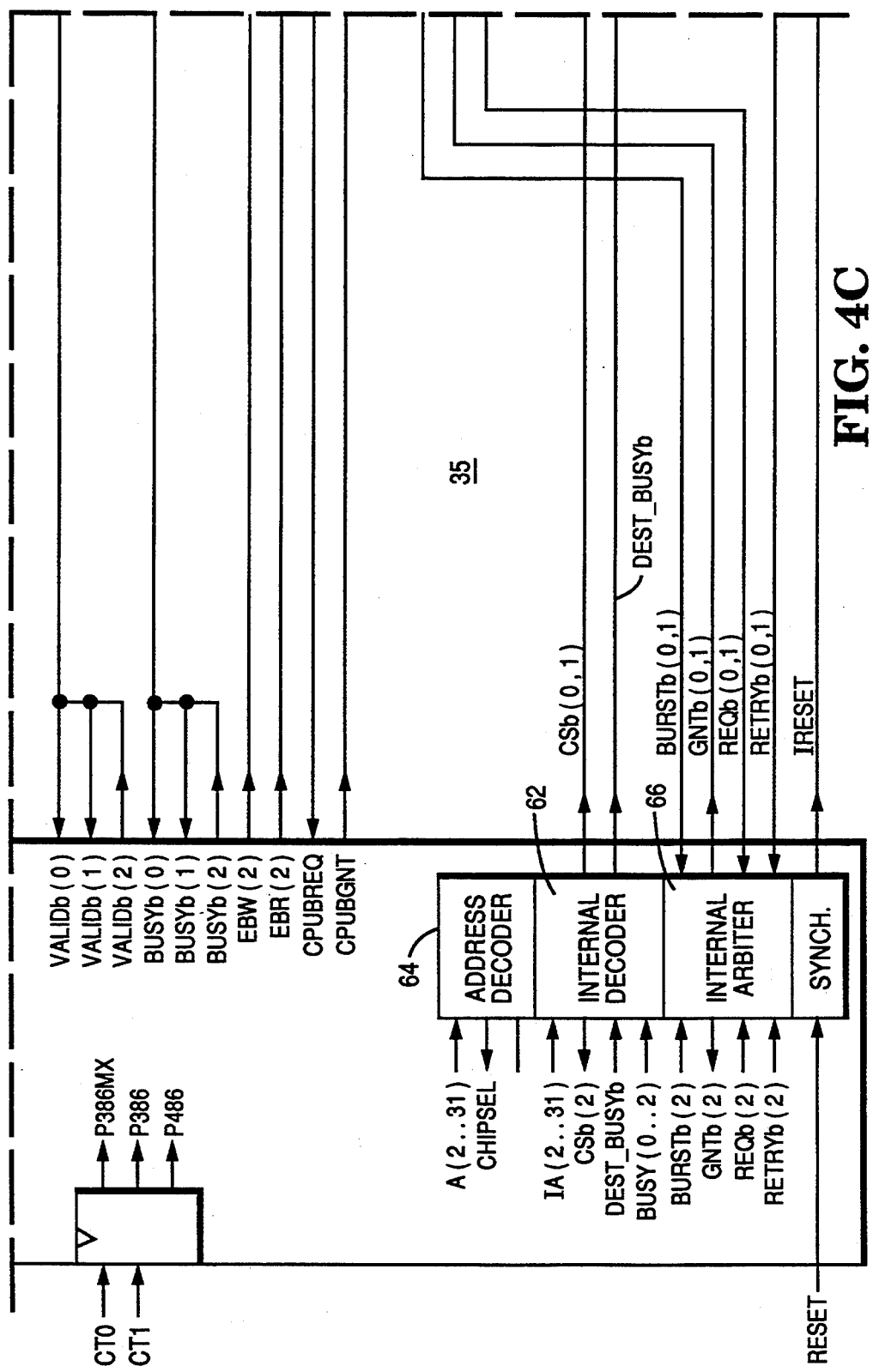
Figure 4D:
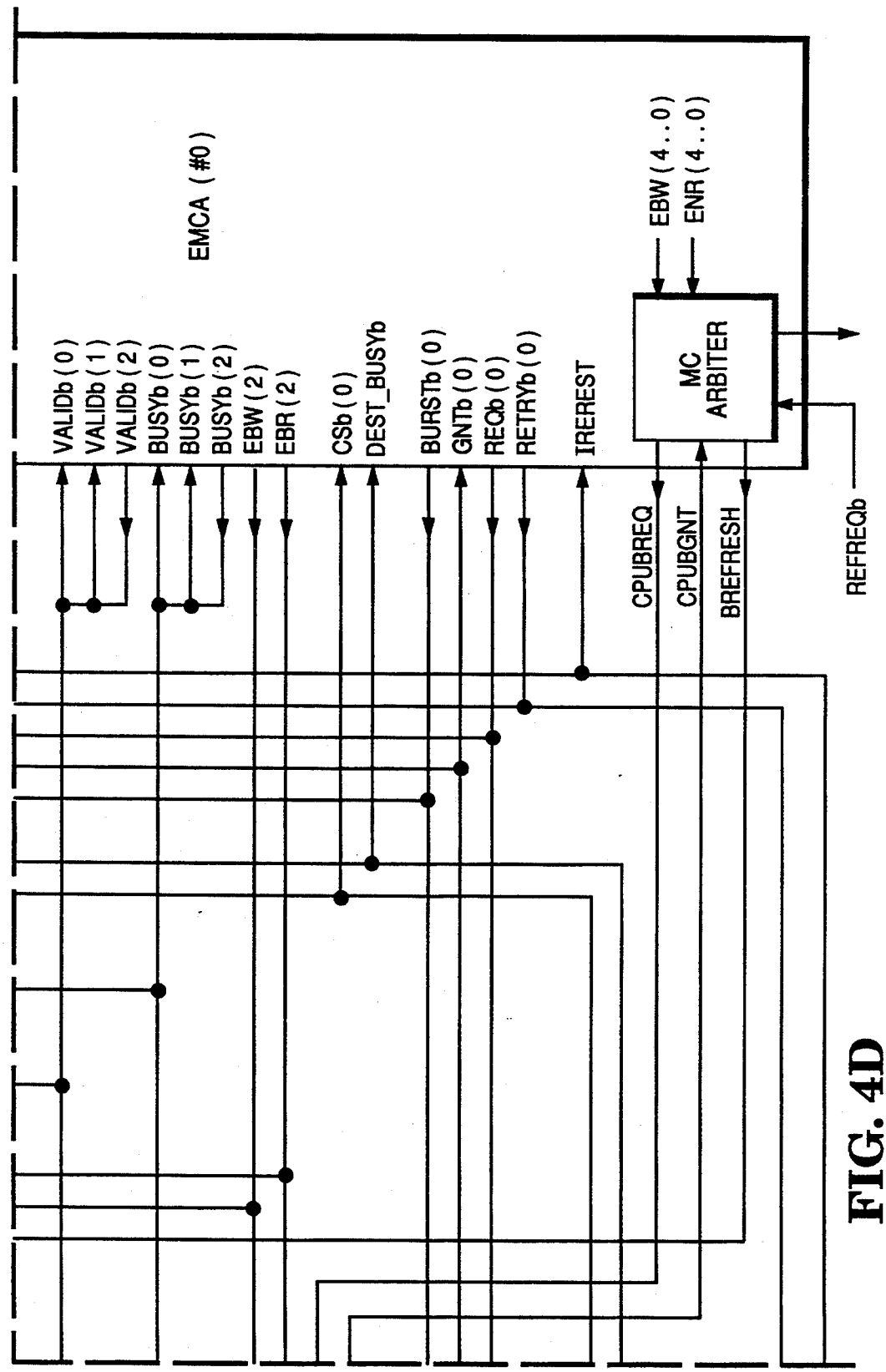

Referring particularly to FIG. 4C, HPI 34 includes an internal decoder 62 which uses the IA2 to IA31 lines to decode the access to the individual units. Every unit has its own address decode signal. This signal is generated for both memory or I/O accesses and all other commands a unit may receive. Also, the internal decoder 62 receives the busy signals of all units such as DMA 36 and EMCA 38 and generates the DEST-BUSYb signal.

Furthermore, the address decoder 64 is provided for receiving the address signals A2 to A31 from the host P/M bus 20 (see FIGS. 2 and 3) and generates the CHIPSEL signal indicating that the corresponding functional block such as BIB 30 has been selected for communication through the host P/M bus 20.

Of particular interest is the internal arbiter 66 included in the HPI 34. To get access to the TRACT 35, a unit such as HPI 34, DMA 36, and EMCA 38 has to assert a request by generating a request signal REQb (0..2) to TRACT 35. Several requests may occur simultaneously. Thus, it is the task of the internal arbiter 66 to resolve these requests and to generate a grant signal GNTb (0..2) for the requesting unit with the highest priority. As mentioned before, in the preferred embodiment EMCA 38 has the highest priority "0" while the HPI 34 has the lowest priority "2". The unit which detects its grant signal at the rising edge of the clock has access to the TRACT 35 for the next cycle.

Another task of the internal arbiter 66 is to handle a burst mode in which there are transmitted a plurality of data words preceded by a single address word. If a unit has detected its grant signal and wishes to carry out multiple data transfers on the TRACT 35, then this unit activates its burst line. For example, if EMCA 38 has requested access to the TRACT 35 by signal REQb(0) and has received access by the internal arbiter 66 transmitting the grant signal GNTb(0) to the EMCA 38, the latter will generate its BURSTb(0) signal for multiple data transfer. When the burst line is activated, the current grant is kept active regardless of requests of any other unit for bus access. Also, the internal arbiter 66 receives the RETRYb(0...2) signals of all units and uses them for reordering the priority for the next cycle.

It should be mentioned that on the TRACT 35 all cycles are synchronous with the clock PCLK on the host P/M bus 20. All clock dependent timing is based on the rising edge of PCLK. This means that the action which refers to PCLK occurs after the next rising edge. That unit, such as DMA controller 36, initiating a cycle on the TRACT 35 is called "master". Therefore, some of the control signals generated by a "master" are preceded by "M". The unit responding to that cycle is called "slave". Thus, some signals generated by a "slave" are preceded by "S". For example, with the DMA 36 requesting data transfer from the Micro Channel 32 to the DRAMs 42 through host P/M bus 20 and MIB 40 the DMA 36 initiates a corresponding cycle on the TRACT 35 for internal communication with HPI 34. A "b" at the end of a signal name means that this signal is active low.

In FIGS. 4A–4D some of the lines of the internal transaction bus, i.e. TRACT 35, have assignments starting with "I" such as IA(2..31) or ID(0..31) in order to distinguish them from similar lines of the host P/M bus 20 such as A(2:31) or D(0..31) for addresses and data, respectively.

Prior to entering into a detailed description of the synchronizer according to the invention it appears useful to briefly indicate the operation within the BIB 30 for a single write cycle as an example.

Basically, it is assumed that the DMA 36 wishes to write data from a Micro Channel device to the DRAMs 42 which is accomplished through the host P/M bus 20 and MIB 40. However, in order to get access to the host P/M bus 20, the address and data are transmitted to HPI 34 forming the interface to the host P/M bus 20 (see FIG. 3).

Write cycles consist of one transfer on the TRACT 35 only. A valid address, data, and command are issued on the TRACT 35 at the same time.

In FIG. 7, line (a) represents the CPU clock PCLK governing the timing of all cycles to be performed. As a first action according to line (b), DMA 36 generates the M-REQb signal going active low which signal is transmitted to the internal arbiter 66 (FIG. 6) which after arbitration returns the M-GNTb signal to DMA 36 according to line (c).

As may be seen from line (d) the following information is presented simultaneously, i.e. in parallel on the lines of TRACT 35: an address IA on address lines IA2 to IA31; data ID(0..31) on lines ID0 to ID31; the unit identification number IDN on two lines IDN(0:1), i.e. for the present example "01" for the DMA 36; and a command IC, specifically on lines IC0, IC1, and IC2 indicating a memory or I/O data write access.

A comparison of lines (d) and (g) of FIG. 7 indicates that DMA 36 generates a M-VALIDb signal for the time the information according to line (d) is presented on TRACT 35. Every unit has a valid line. This line is activated when the master unit detects a GRANT and puts valid address, data, and command on the TRACT 35. As long as address, data, and command are valid the VALIDb signal is active.

A VALIDb signal can be activated even if the receiving unit is currently busy. In this case the TRACT 35 and the valid signal have to remain activated until the receiving unit resets its BUSY line. Then the master can deactivate VALIDb and release the TRACT 35 on the next rising edge. The signal M-BURSTb according to line (e) inactive high indicates the situation that no burst mode operation is intended. Line (f) illustrates the S-BUSYb signal going active low generated by the HPI 34 as a slave indicating the taking-over of the information according to line (d) for presenting it to the host P/M bus 20 independent of the further operation within the BIB 30. Every unit has its own busy line. The busy line is used to tell other units that a unit can not accept a new command.

BUSYb is activated only if a unit has received a command which requires more than one clock cycle to be finished. In this case busy is activated immediately on the rising clock edge after a unit received a valid command.

As long as a unit's BUSYb is deactivated the unit is able to accept a new command from the TRACT 35 on the next rising edge of the clock. Busy is deactivated one clock before completion of the command.

As regards the situation illustrated in the right-hand part of FIG. 7, this differs from that illustrated in the left-hand part in that there is a delay due to the fact that the address slave unit, i.e. HPI 34, is busy in the current TRACT bus cycle. Accordingly, the signals illustrated in the lines (b), (c), (d), and (g) are extended until the DEST-BUSYb signal, line (h) generated from the internal decoder 62 of the HPI 34 and indicating the busy signal goes inactive high again.

With the M-RETRYb signal according to line (i), DMA 36 may influence the internal arbiter 66 to rearrange priority.

Referring now specifically to FIGS. 3, 4, and 5, there will be explained further details of the EMCA unit 38 which is specifically designed according to the invention.

Basically, the EMCA unit 38 incorporates the logic to interface the internal transaction bus TRACT 35 of the BIB 30 with the extended Micro Channel bus 32. Thus, the EMCA unit 38 generates a CPU independent timing for the Micro Channel 32.

Figure 5A:
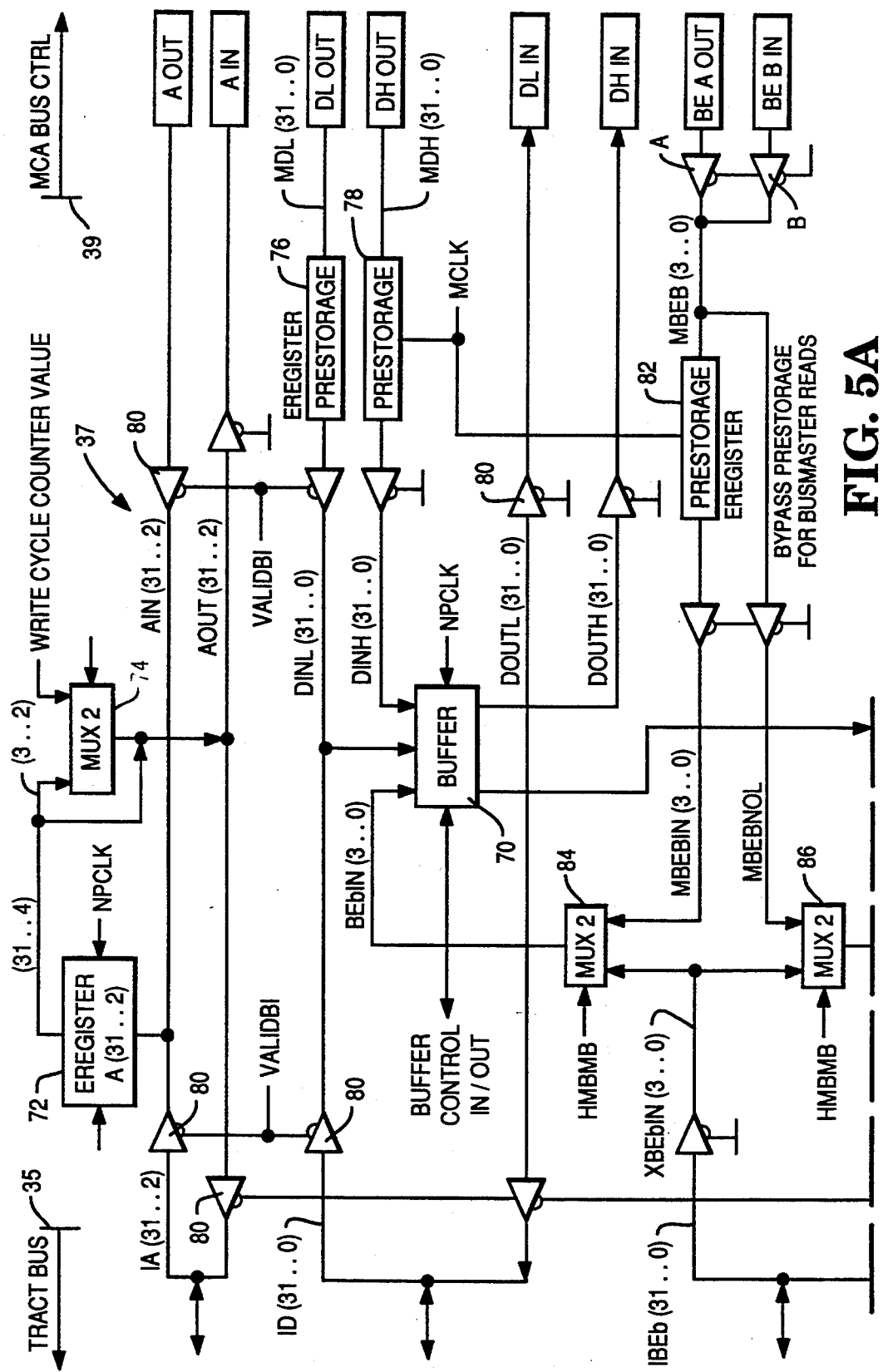
FIGS. 5A and 5B are a block diagram of a synchronizer used in the BIB.
Figure 5B:
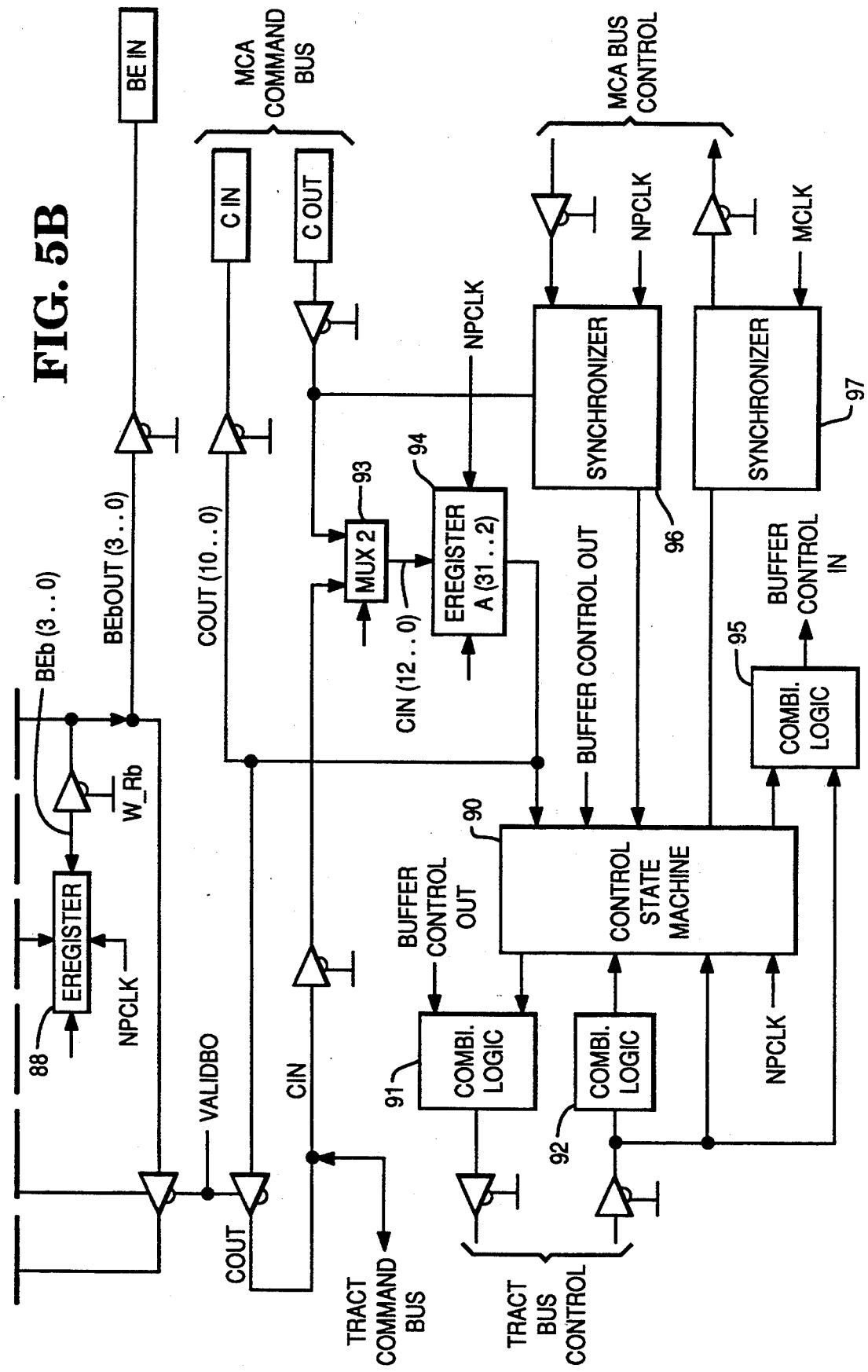

FIGS. 5A–5B show the synchronizer 37 of the preferred embodiment of the invention in more detail. Specifically, it should be understood that the synchronizer 37 interfaces the internal transaction bus TRACT 35 (left-hand side of FIG. 5A) of the BIB 30 (FIGS. 3 and 4) with the MCA unit 39 (right-hand side).

The main function of the synchronizer 37 is to compensate for the different operating frequencies of the CPU 10 and the Micro Channel 32, and to buffer data in order to smooth data transfer, and enhance the flexibility of the system.

Specifically, the synchronizer 37 synchronizes transfers between the MCA unit 39 and the internal transaction bus TRACT 35 of the BIB 30. This is particularly necessary since the MCA unit 39 is clocked at 40 MHz, regardless of the CPU frequency which may operate at varying frequencies between 20 MHz and 33 MHz, for example. In addition, the synchronizer 37 provides buffering of EMCA streaming data which means data transmitted at a very fast data rate of up to 80 MB/second in blocks of 64 bits. This is done by a buffer 70 comprising eight registers each having a width of 68 (64+4) bits.

As will now be explained, the synchronizer 37 includes four internal bus pairs. All the signals entering or leaving the synchronizer SYNC 37 are buffered. Some of these buffers are constantly enabled.

As may be seen on the left-hand side of FIG. 5A, the address bus IA(31:2) of the TRACT 35 which is bi-directional communicates with an address bus pair split into an input address bus ain(31:2) and an output address bus aout(31:2). The input and output address buses are connected to latches Aout and Ain of the MCA unit 39.

It should be generally noted that the direction of data flow is determined by drivers 80 driven by corresponding control signals for data input and output validbi and validbo.

Data lines ID(31:0) of the TRACT 35 communicate via the internal bus lines dinl(31:0), doutl(31:0), and douth (31:0), partially through appropriate prestorage Eregisters 76, 78, with corresponding latches DLout, DHout, DLin, DHin of the MCA unit 39, with DL indicating the lower portion of data comprising 32 bits and DH referring to the higher portion of data of 32 bits.

The IBEb(3:0) lines of the TRACT 35 for the byte enable signals communicate with the internal synchronizer bus lines bebin(3:0) and bebout(3:0) and through some additional circuitry to be explained later, such as the multiplexers MUX2 84 and 86 and further Eregisters 82, 88 with corresponding latches BEAout, BEBout, and BEin of the MCA unit 39.

Similarly, the TRACT 35 command bus Cout and Cin communicates through the internal synchronizer bus lines cout (10:0) and cin (12:0) and a multiplexer MUX2 93 with the corresponding latches cin and cout of the MCA unit 39.

The control portion of the synchronizer 37 mainly comprises a control state machine 90 connected to the TRACT 35 control through some combinational logic circuitry 91, 92 and 95. Also communicating with the control state machine 90 are synchronizing circuits 96 and 97.

The control input portion of the internal synchronizer bus further includes an Eregister(12:0) 94.

A most important unit of the synchronizer 37 is the buffer 70 connected to the data input lines and data output lines dinl(31:0), dinh(31:0), doutl(31:0), and douth(31:0), and to the internal byte enable lines bebin(3:0) and bebout(3:0).

It should be noted that there are two clock signals, i.e. the CPU clock NPCLK and the Micro Channel clock MCLK with the data and byte enable signals presented by the MCA unit 39 through the prestorage registers 76, 78, 82, clocked by the Micro Channel clock MCLK, and with the input/output of the buffer 70 clocked by the CPU clock NPCLK. Therefore, this provides an independent timing between the CPU 10 and the Micro Channel 32, independent of the operating frequency selected for the CPU 10, with usually the MCLK having a higher frequency (such as 40 MHz) than the CPU clock (between 20 MHz and 33 MHz). The buffer 70 has an excellent buffering capability smoothing out considerable time differences and interruptions in data transfer such that an optimum continuity is achieved. Also, the buffer 70 provides the system with considerable flexibility.

After having explained the main structure of the synchronizer 37, some more details will be given in respect of the function thereof.

As mentioned before, the address bus IA(31:2) of the TRACT 35 is connected to the bi-directional internal address bus of the synchronizer 37. The gating of the addresses is controlled by the signal called validbi which means "let addresses enter" from the TRACT 35 into the SYNC 37, and by the signal validbo which means "issue an address" on to the TRACT 35.

It should be noted that the aout bus is always connected to the MCA input latches Ain to ensure no floating inputs at the MCA inputs. The output address value of the MCA output latches Aout is gated on to the ain bus whenever no valid address is gated in from the TRACT 35.

If a valid command is issued from the TRACT 35 to the SYNC 37 then the address from the ain bus is stored in the Eregister 72, the output of which is connected to the aout bus; hence the incoming address is passed on to the aout bus just after storing the address value in the Eregister 72.

The lower two address bits aout (2) and aout (3) are multiplexed by means of a multiplexer MUX2 74 with a 2-bit counter output for providing a proper start address for a burst read cycle. The SYNC 37 provides the proper start address for an MCA slave device which is not able to return the data in a streaming mode to the SYNC 37.

Whilst the lower 32 bits of the internal synchronizer data bus, i.e. dinl(31:0)/doutl(31:0), are controlled in the same way as the address bus described above, the upper 32-bit internal synchronizer data bus, i.e. dinh(31:0)-/douth(31:0) is only connected to the MCA latches DLin and DHin to provide a 64-bit transfer capability, which is required when the Micro Channel 32 is operating in the streaming mode. The dinh/douth lines are always enabled to drive valid voltage levels on to these buses which may be recognized by the corresponding drivers control input being grounded.

As will be explained in more detail below, the data stored in the buffer 70 may be in a 32-bit or a 64-bit format.

The prestorage Eregisters 76 and 78 are connected to the MCA data output latches DLout and DHout of the MCA unit 39, allowing the MCA unit 39 to latch new data from the Micro Channel bus even before the previous data word has been stored in the buffer 70. This allows writing the data from the MCA unit 39 to the SYNC 37 in a time overlapping fashion manner.

The byte enables lines bebin/bebout (3:0) are controlled in the same way as the address lines. However, the byte enable values are stored in the buffer 70 if a write transaction takes place, the byte enable values stored in a register providing an indication of which bytes stored in the register are valid. During read transactions, the byte enable values are stored in the Eregister 88 in the same way as the addresses.

The byte enable storage in the buffer 70 is necessary in 16-bit MCA write cycles. The MCA unit 39 assembles 32-bit words during the write operation and sends them to the SYNC 37 with all byte enables active. However, if the last transfer is just a 16-bit transfer, the byte enables have to be set to the proper value to inform the MIB 40 (FIG. 1) how to store the 16-bit word.

The byte enable path from the MCA unit 39 to the buffer 70 also contains the additional prestorage Eregister 82 for the same reason as for the data path described above. For read cycles this additional stage is bypassed.

The byte enables from the TRACT 35 and MCA unit 39 are combined to one byte enable bus via the two multiplexers 84 and 86, one being connected to the input of the buffer 70 and the other being connected to the external byte enable Eregister 88.

As regards command bus signals, they will also be received from the MCA unit 39. The multiplexer 93 gates the proper command bus signals to the Eregister 94 depending on which block is allowed to send a valid command. The Eregister 94 is clocked whenever a new cycle is started with a valid command signal either from a hostmaster, i.e. CPU 10, or another busmaster.

Command and control bus signals which leave the SYNC 37 are mostly generated by the SYNC state machine 90 in combination with some combinational logic 91, 92, 95.

Since most of the command bus and control bus signals are used by the state machines in the MCA and SYNC units they have to be synchronized before they are used.

The synchronizers 96, 97 comprise two flipflops each. The input flipflop is clocked with the falling edge of the synchronizing clock and the second flipflop is clocked with the rising edge thereof. This synchronizing scheme allows to synchronize signals with a delay of =clock cycle (best case) and 1=clock cycles (worst case).

Referring now to FIG. 6, the design and function of the buffer 70 will be explained in more detail.

The buffer 70 has a dual ported design and is eight registers deep with a width of each register of 68 bits. In the preferred embodiment, the buffer 70 is implemented by Eregisters (which means registers active when enabled) though other types of memory may also be used. Each register of the buffer 70 has two 32-bit data storage locations, such as DOL and DOH, and a 4-bit section, such as BEO, for the byte enable values. The buffer registers such as $70_0$ are selected by write or read pointer values, the write pointer value being obtained by combining a base address with a variable offset generated by a decoder. As shown in FIG. 6, such an addressing is accomplished with a write address controller 83 and a read address controller 85. Each of the controllers 83 and 85 includes a pointer register, with the write address controller 83 also including an offset decoder for determining the offset value to be added to the base address. This makes it possible to use the buffer 70 as a "sorting memory". In addition to a pointer register, each of the write address controller 83 and the read address controller 85 includes a counter for determining which of the data storage locations of a buffer register pointed to by the relevant pointer register is to be accessed. It should be noted that all write and read actions on the buffer 70 work fully synchronous with the host CPU clock NPCLK of the CPU 10 (FIGS. 1 and 2).

As mentioned before, the "master" for a data transfer may be the host CPU 10 as a "hostmaster" or an MC master device called "busmaster". During hostmaster write cycles the data word size does not exceed 32 bits corresponding to the width of the host P/M bus 20 (FIGS. 1 to 3) and the internal transaction bus TRACT 35 of the BIB 30. If a valid data word is issued on the internal transaction TRACT 35 to the SYNC 37 the data word is written in the DOL register for the first lower 32-bit entry DOL in parallel with the byte enable value which is stored in the BEO register. The DOL location is selected by the write pointer (base address) and an offset value of 0 by the write address controller 83.

The write pointer of the write address controller 83 is locked during the hostmaster write cycles pointing to the first entry in the buffer 70. Thus, only one of the eight buffer registers is used for hostmaster write cycles in which a single data word is transmitted. Nevertheless, the SYNC 37 may accept further data. At the same time when the MCA unit 39 reads the data from the buffer 70 the latter may accept new data from the TRACT 35. Hence, the combination of SYNC 37 and the MCA unit 39 makes up a "2-stage data pipeline" which allows an optimum hostmaster write cycle performance.

The read pointer of the read address controller 85 is also locked during hostmaster write cycles and points to the same register as the write pointer. As soon as the MCA unit 39 receives a start command from the SYNC 37 it takes the data from the buffer 70 and writes it to the selected MCA device.

As regards hostmaster read cycles, they differ from write cycles as follows: A read request is received from the TRACT 35 and the address and the byte enable values are stored in the respective registers and passed to the MCA unit 39.

The writing to the buffer 70 is done in a "read return" procedure storing the valid data in DOL as addressed by the write pointer+offset value 32 0. As soon as TRACT 35 is free, the data is "read returned" as addressed by the read pointer on to the TRACT 35. During this cycle the SYNC 37 is unable to accept a new command as opposed to the write cycle because it waits for the return of data from the MCA unit 39.

A further type of possible data transfer is a hostmaster BURST mode. A hostmaster BURST read cycle basically starts like a regular hostmaster read cycle.

After the start address has been received by the MCA unit 39, the latter accesses the addressed MCA device and "read returns" four 32-bit words to the buffer 70 or two 64-bit data blocks if the MCA device is operating in a high speed 64-bit streaming mode. If four 32-bit words from the MCA unit 39 are written into the buffer 70 in a regular BURST mode (not streaming mode), these are written in sequence into four separate buffer registers as selected by the write pointer. If two 64-bit data blocks from the MCA unit 39 are written into the buffer 70 in streaming mode, the two blocks are written in sequence into two buffer registers as selected by the write pointer, all the bits making up each block being written simultaneously into the selected buffer register. The order in which the two 32-bit data words making up a 64-bit data block are written into the two data storage locations of the selected buffer register is determined by the counter of the write address controller 83. In a BURST mode, the host processor CPU 10 expects up to four 32-bit data words which in the case of the CPU 10 being an Intel 08486 microprocessor have to be returned in a certain sequence determined by the lower start address bits A(2) and A(3); e.g. for A(3)=1 and A(2)=0 the CPU 10 expects data in the address sequence addr3, addr4, addr1, addr2. If the MCA device delivers the data in a streaming mode comprising 64-bit blocks of data it can only provide it in the regular sequence addr1, addr2, addr3, and addr4. However, the write address controller 83 enables the data words transmitted from the MCA unit 39 in a streaming mode to be written into the buffer 70 in the correct order as required by the host processor CPU 10.

Thus, the data received from the MCA unit 39 is written into the buffer 70 in such a way that it can be read by just incrementing the read pointer, i.e. by reading the contents of the registers of the buffer 70 in a predetermined sequence, with the storage locations of each register also being accessed in a predetermined sequence. This means that the data words are sorted during the "read returns" from the MCA. The buffer register where each data word is stored is addressed by the base write pointer value plus an offset value generated by the decoder contained in the write address controller 83, and is determined by the start address given by the CPU 10.

It should be noted that during a 32-bit read return from the MCA 39 in which no sorting is required the data is written into the first four register locations DOL to D3L by sequentially advancing the write pointer from location DOL to location D3L.

As regards a busmaster write cycle, an MCA master device writes the data into the buffer 70 in a 64-, 32-, 24-, 16-, or 8-bit format. Along with the data the buffer 70 stores the necessary byte enable information. To the SYNC 37 all the writes look like either 32- or 64-bit writes. The MIB 40 (FIGS. 1 and 2) which receives such data determines the data width by checking the byte enable values. These are the same for 64- and 32-bit data because the data is passed in 32-bit words on the TRACT 35 and the host P/M bus 20.

During the single writes to the buffer 70, the registers thereof are always selected by the write pointer value+offset=0. During a regular 8-, 16-, or 32-bit write only one write operation takes place.

Once a status is reached on the Micro Channel 32 (FIG. 1) which allows the MCA unit 39 to pass the data size and streaming mode information to the SYNC 37, the SYNC 37 starts a "stream write" or a "regular write" to the selected device, such as an MIB 40, on the TRACT 35. The data is taken out of the buffer 70 on to the TRACT 35 under control of the read pointer. The data is selected sequentially. If a 64-bit MC device carries out a write cycle, then the read cycle counter is used in addition to the read pointer to gate the 32-bit data words stored in storage locations of the buffer 70 on to the TRACT 32-bit data bus 35, similar to a burst read operation explained before.

During busmaster read/stream read cycles, the SYNC 37 issues a "burst read" to the TRACT 35 regardless of whether it turns out to be a "regular read" or a "stream read".

The 32-bit data words from the TRACT 35 are written into the buffer 70 in a 64-bit fashion, which means that the first incoming word is gated or demultiplexed to location DOL, the second one to DOH, the third one to D1L, etc. The addressing of the different locations is done with the write pointer+offset=0 in combination with the write cycle counter included in the write address controller 83. This counter locks up the write pointer every other cycle in order to allow writing the higher 32-bit location, such as D2H.

From the foregoing it may be gathered that the synchronizer SYNC 37 according to the invention is adapted to handle various different data transfer procedures with optimum data transfer performance independent of differences between the frequency of the CPU 10 and the frequency of a Micro Channel device and of the width with which data is presented on the Micro Channel 32.

As mentioned before, in the BIB 30 there is provided a DMA controller 36 for controlling direct memory access to the DRAMs 42. Whilst with known systems this DMA controller was designed as a separate unit including all functional control circuitry such as logic and registers and also memory portions for latching data to be transferred from an MCA device to the system memory and vice versa, according to the invention the functional operation of the DMA controller has been separated from the timing of data transfer which is taken over by the synchronizer SYNC 37. Accordingly, the DMA controller is designed more effectively and has improved performance.

This is particularly true for a design incorporating the DMA controller 36 and the synchronizer 37 together with the MCA unit 39 and the interfacing unit 34 in a single, self-contained functional block.

It should be noted that there is no need for CPU 10 to attend to all details of the above explained operation of the functional block BIB 30. Thus, each functional block is a type of self-contained unit, relieving the CPU 10 of the need to control start of write/read cycles which are performed within the BIB 30 on the TRACT 35.

Specifically, after the CPU sends a command to a functional block the latter performs this command without further control by the CPU. For example, such a command sent to a BIB 30 may be write data from the Micro Channel 32 to DRAM 42, which is carried out under the control of the DMA controller 36. As will be appreciated, each functional block contains the logic and circuitry, such as flipflops, to perform such processes. All this is contained in a so called "state machine" which may be implemented by a skilled person according to the specific requirements and processes to be performed. It should be noted that read and write operations are performed on a master/slave basis in one cycle each with a specific improved performance for read cycles: after a one cycle read request by a master the slave independently returns the requested data in one cycle as soon as it is ready.

Also, it should be noted that in connection with the request/grant procedure of a BIB 30 the bus master function is transferred from the CPU 10 to the BIB 30 which is indicated by a dynamic change of the CTIN(0..1) signal (FIG. 2) to "11", presented to the MIBs 40 and the BIBs 30 as signal CT(0..1).

Thus, it will be appreciated that due to the novel architecture of the work station the overall performance is considerably improved by enhancing the operating speed and reducing wait states. Furthermore, standardizing the required functional blocks for use in different configurations including various types of microprocessors and multiple provision of Micro Channel and memory blocks offers considerable cost reductions in production, assembly, and service.

This is particularly true for the work station of the preferred embodiment where each functional block is implemented by one chip, each preferably formed by HCMOS devices. Each chip comprises all subunits, such as registers and logic circuitry required. Though the chips are standardized they may be used in a variety of system configurations since they include ample register space for configuration data such as type of CPU, operating frequency, DRAM memory space and so on.

As an example, the chip may be implemented in an ASIC package using 208 pins which may be easily placed on the system board of the work station.

The detail design of the present invention is captured in CDL, a high level hardware description language. CDL is a software tool which unambiguously defines the hardware for a digital logic system. The attached CDL listing completely defines a preferred embodiment of the present invention. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

It will be clear to those skilled in the art that the present invention is not limited to the specific embodiment disclosed and illustrated herein. Nor is the term "work station" limited to a particular type of computer, but it is to be interpreted in its broadest sense to include any data processing system.

Numerous modifications, variations, and full and partial equivalents can be undertaken without departing from the invention as limited only by the spirit and scope of the appended claims.

What is desired to be secured by Letters Patent of the United States is as follows.

/********************** Synchronizer *****************************/
/*                                                                    */
/* This block contains the logic description of the Synchronizer between */
/* the transaction bus (XACT-bus) and the micro channel interface.    */
/*                                                                    */
/*                                                                    */
/*                                                                    */
/*                                                                    */
/*                                                                    */
/*                                                                    */
/*                                                                    */
/*                                                                    */
/**********************************************************************/

```
.INPUT   IRESET,
         BURSTALLb,VALIDALLb,INCSb,INGNTb,DEST_BUSYb,
         IREFRESH,DMA_ACT,

MA[31:2],MBEb[3:0],MDL[31:0],MDH[31:0],MC64_D32,
         MCSTARTb,MCBUSYb,MCNEXTb,MCDONE,MCNO_STREAM,MC486B,
         MM_IOb,MW_Rb,MCPUBREQ,MREFRESH,MDMACMD,H_ACT;

.OUTPUT  OVALIDb,OBUSYb,OREQb,OBURSTb,ORETRYb,BREFRESH,CPUBREQ,

SA[31:2],SBEb[3:0],SDL[31:0],SDH[31:0],
         S486B,SRESET,SCONFIG,SSTARTb,SABORTb,SM_IOb,SW_Rb,
         STCb,SREF,SDMACMD,SDMA_ACT,OEBR,OEBW;

.BIDI    IA[31:2],IBEb[3:0],IDN[1:0],ID[31:0],
         IM_IOb,IW_Rb,ID_Cb,IRTNCMD,IDMACMD,IMCABURST,ITCb,ICONFIG,
         I486BURST;

.IFLEVEL TOP
.CLOCK   NPCLK,MCLK;
.edge rising NPCLK;
.vector 0;
.edge rising MCLK;
.vector 1;
.edge rising NPCLK;

.ELSE
.INPUT NPCLK,MCLK;
.ASSIGN NPCLK;
.ASSIGN MCLK;
.edge rising NPCLK;
.ENDIF /* Inputs from XACT bus */

/* TEST circuit addition for BURSTALLb, VALIDALLb */
.IFLEVEL TOP
TESTBURSTb = BURSTALLb & OBURSTb;
TESTVALIDb = VALIDALLb & OVALIDb;
Buffer(0, TESTBURSTb,  burstallbi);
Buffer(0, TESTVALIDb,  validallbi);
```

```
.ELSE
Buffer(0,      BURSTALLb,    burstallbi);
Buffer(0,      VALIDALLb,    validallbi);
.ENDIF Buffer(0,      IRESET,       xireset);
Buffer(0,      DEST_BUSYb,   xdest_busyb);
Buffer(0,      INCSb,        xcsb);
Buffer(0,      INGNTb,       xgntb);
Buffer(0,      IREFRESH,     irefreshi);
Buffer(0,      DMA_ACT       dma_acti);

/* Outputs to XACT bus */

Buffer(0,      validbo,      OVALIDb);
Buffer(0,      busybo,       OBUSYb);
Buffer(0,      reqbo,        OREQb);
Buffer(0,      burstbo,      OBURSTb);
Buffer(0,      retrybo,      ORETRYb);
Buffer(0,      brefresho,    BREFRESH);
Buffer(0,      cpubreqo,     CPUBREQ);

/* XACT bidirectional signals */

Buffer(validbi,   IA[31:2],    ain[31:2]);
Buffer(validbo,   aout[31:2],  IA[31:2]);
Buffer(validbi,   ID,          dinl[31:0]);
Buffer(validbo,   doutl[31:0], ID);
Buffer(0,         IBEb,        Xbebin[3:0]);
Buffer(validbo,   bebout[3:0], IBEb);
Buffer(0,         IDN,         idnin[1:0]);
Buffer(validbo,   cout[5:4],   IDN);
Buffer(0,         IDMACMD,     idmacmdi);
Buffer(0,         IM_IOb,      miobi);
Buffer(0,         IW_Rb,       wrbi);
Buffer(0,         ID_Cb,      idcbi);
Buffer(0,         IRTNCMD,     irtncmdi);
Buffer(0,         IMCABURST,   imcabursti);
Buffer(0,         ITCb,        itcbi);
Buffer(0,         ICONFIG,     iconfigi);
Buffer(0,         I486BURST,   i486bursti);
Buffer(validbo,   cout[8],     IDMACMD);
Buffer(validbo,   cout[6],     ICONFIG);
Buffer(validbo,   cout[0],     IM_IOb);
Buffer(validbo,   cout[1],     IW_Rb);
Buffer(validbo,   cout[2],     ID_Cb);
Buffer(validbo,   cout[3],     I486BURST);
Buffer(validbo,   MCASTREAM,   IMCABURST);
Buffer(validbo,   cout[10],    ITCb);
Buffer(validbo,   irtncmdo,    IRTNCMD);

/* Inputs from MCA

Enable ADDRESS and DATA_LOW input whenever the XACT bus inputs
are dissabled;
```

```
*/
MDAieb = !validbi;

/* Intermediate latch stages to guarantee correct data transfer
   from the MCA to the FIFO registers. The intermed signal is a half
   MCLK wide enable signal which is active low.
*/
Latch(intermed,MDL, int_dinl[31:0]);
Latch(intermed,MDH, int_dinh[31:0]);
Latch(intermed,MBEb,int_Mbebin[3:0]);

Buffer(0,       MC64_D32,       mca6432);
Buffer(0,       MCSTARTb,       MCAVALIDb);
Buffer(0,       MCBUSYb,        MCABUSYb);
Buffer(0,       MCNEXTb,        MCANEXTb);
Buffer(0,       MCDONE,         mcadone);
Buffer(0,       MCNO_STREAM,    mcanostream);
Buffer(0,       MC486B,         mcas486);
Buffer(0,       MM_IOb,         mcamio);
Buffer(0,       MW_Rb,          mcawr);
Buffer(MDAieb,  MA[31:2],       ain[31:2]);
Buffer(MDAieb,  int_dinl,       dinl[31:0]);
Buffer(0,       int_Mbebin,     Mbebin[3:0]);
Buffer(0,       MBEb,           Mbebnol[3:0]);
Buffer(0,       int_dinh,       dinh[31:0]);
Buffer(0,       MREFRESH,       mcabref);
Buffer(0,       MCPUBREQ,       mcacpub);
Buffer(0,       MDMACMD,        mcadmacmd);
Buffer(0,       H_ACT,          mc_hmbmb);

/* cut down or extend the microchannel busy response to 3 clock cycles */
.edge rising MCLK;
QS1e := MCABUSYb;
Busy_pulse = !QS1e & MCABUSYb;
/* create a one MCLK wide Busy_pulse from the MCA busy signal */
/* The following lines implement 2 MS D-FF's which produce a 2 MCLK
   cycle pulse from the MCA Busy_pulse. This pulse controls a latch
   which generates a 3 MCLK cycles wide pulse from any kind of
   MCABUSYb signal, wether it is only one cyle or x cycles wide !
*/
.edge falling MCLK;
QS1f := Busy_pulse;
.edge rising MCLK;
QS1g := QS1f;
.edge falling MCLK;
QS1h := QS1g;
.edge rising MCLK;
QS1i := QS1h;
Latch_hold = QS1f # QS1g # QS1h # QS1i;
Latch(Latch_hold,MCABUSYb,MCABUSYb3c);

/* The following logic shows how the sm64 bit flag from the MCA block
   is generated. The mca6432lock signal is still synchronous to MCLK !!
*/ mca64lock :=   !mca64lock &  mca6432    /* Set FF if 64 bit */
             #  mca64lock & !soebro;    /* Clear FF if in IDLE1 or IDLE2 */
``` mca6432lock = mca6432 # mca64lock; /* Run this signal through sync.
                                      to generate sm64 */

```
.edge falling NPCLK;
QS1a := mcabref;
QS1b := MCAVALIDb;
QS1c := MCABUSYb;
QS1j := MCABUSYb3c;
QS1k := mcacpub;
QS1l := mc_hmbmb;
QS1m := mca6432lock;
QS1n := mcas486;
QS1o := mcawr;
QS1p := mcadone;
QS1q := mcanostream;

.edge rising NPCLK;
brefresho  := QS1a;
startbi    := QS1b;
sbusybi    := QS1c;
sbusybi3c  := QS1j;
cpubreqo   := QS1k;
hmbmb      := QS1l;
sm64       := QS1m;
s486       := QS1n;
smcawr     := QS1o;
done       := QS1p;
nostream   := QS1q;

/* Next signal synchronization and MCA_access signal generation */

.edge falling NPCLK;
QX1a := MCANEXTb;       /***** SYNC from falling edge *****/

.edge rising NPCLK;
QX1b := QX1a;
QX1c := QX1b;
snextbi_f = !(QX1c & !QX1b & doneb_r);
doneb_f := snextbi_f;  /* dissable generation of additional next if sync
                          of falling edge happend first */

QX2a := MCANEXTb # !S20MHZ;  /***** SYNC from rising edge (20MHz) *****/

.edge falling NPCLK;
QX2b := QX2a;

.edge rising NPCLK;
QX2c := QX2b;
QX2d := QX2c;
snextbi_r = !(QX2d & !QX2c & doneb_f);
doneb_r := snextbi_r;  /* dissable generation of additional next if sync
                          of rising edge happend first (only 20MHz) */ snextbi = snextbi_r & snextbi_f;
mca_access = !snextbi;
.edge falling MCLK;
QM1a := xireset;
```

```
QM1b := SM_startbo;
QM1d := dma_acti;
QM1e := abortb;
QM1g := oebro;
QM1h := oebwo;

.edge rising MCLK;
MCARESET := QM1a;
MCAV_CMD := QM1b;
MCAdma_act := QM1d;
sabortbo    := QM1e;
soebro      := QM1g;
soebwo      := QM1h;

.edge falling MCLK;
QM1f := MCANEXTb;
.edge rising  MCLK;
QM2f := QM1f;
intermed1 = !QM1f & QM2f;          /* latch enable for intermed. pipeline stage
                                      during 16MHz,25MHz,33MHz. */

QM3f := intermed1;
.edge falling MCLK;
intermed2 := QM3f;                 /* for 20 MHz operations from the MCA to the
                                      XACT bus, the intermediate stage must not
                                      change the data values until 2 MCLK cycles
                                      after a MCANEXTb was issued otherwise there
                                      might be a problem with STREAMING mcde */ intermed = !(!S20MHz & intermed1 # S20MHz & intermed2);

.edge rising NPCLK;

/* Outputs to MCA */

Buffer(0,    cout[3],       S486B);
Buffer(0,    MCARESET,      SRESET);
Buffer(0,    MCAV_CMD,      SSTARTb);
Buffer(0,    cout[6],       SCONFIG);
Buffer(0,    sabortbo,      SABORTb);
Buffer(0,    MCAdma_act,    SDMA_ACT);
Buffer(0,    cout[0],       SM_IOb);
Buffer(0,    cout[1],       SW_Rb);
Buffer(0,    bebout[3:0],   SBEb[3:0]);
Buffer(0,    doutl[31:0],   SDL);
Buffer(0,    douth[31:0],   SDH);
Buffer(0,    aout[31:2],    SA[31:2]);
Buffer(0,    cout[7],       SREF);
Buffer(0,    cout[8],       SDMACMD);
Buffer(0,    cout[10],      STCb);
Buffer(0,    soebro,        OEBR);
Buffer(0,    soebwo,        OEBW);

/* The first couple of Erregisters is used in a future self test. The
   last two store the Processor speed information.
```

```
*/
SYNT_ADDR =   (ain[9:2] == 0x80);
SYNR_ADDR =   (ain[9:2] == 0x81);
SYNT      =   SYNT_ADDR &  wrbi & iconfigi & !validbi;
SYNR      =   SYNR_ADDR & !wrbi & iconfigi & !validbi;
SPEED = (ain[9:2] == 0xC5) &  wrbi & iconfigi & !validbi # xireset;
clearb = !xireset;
/* .SIGNAL testout[7:0]; */
/* testout = 0xab;       */
testdone = 1; /*******************************/
Erregister(SYNT,clearb,dinl[7:0],testin[7:0]);
/* Erregister(testdone,clearb,testout[7:0],dtoutl[7:0]); */
Erregister(testdone,clearb,0xab,dtoutl[7:0]);

dinsp0 = xireset # !xireset & dinl[2];
dinsp1 = xireset # !xireset & dinl[3];
Eregister(SPEED,dinsp0,xsp0);
Eregister(SPEED,dinsp1,xsp1);

result = (areg[9:2] == 0x81) & !cout[1] & cout[6] & !validbo;
Mux2(result,dfoutl[7:0],dtoutl[7:0],doutl[7:0]);
doutl[31:8] = dfoutl[31:8];

/* Speed information derived from the speed Erregisters
S33MHz = xsp1 &  xsp0;
S25MHz = xsp1 & !xsp0; */
S20MHz = !xsp1 &  xsp0;

/* Multiplexers for the control lines accessing the Synchronizer
   block from the XACT bus and the MCA bus
   External storage register for the XACT and MCA control bits.
   The variable pre_stream is true if a busmaster read has to be
   done and it is sure that a streaming mode has to be started (!nostream).
*/
pre_stream = !hmbmb & !smcawr & !startbi & SM_NEWC2 & !nostream;

.SIGNAL cin[12:0];
Mux2(hmbmb,mcamio,     miobi,        cin[0]);
Mux2(hmbmb,mcawr,      wrbi,         cin[1]);
Mux2(hmbmb,1,          idcbi,        cin[2]);
Mux2(hmbmb,0,          i486bursti,   cin[3]);
Mux2(hmbmb,0,          idnin[1:0],   cin[5:4]);
Mux2(hmbmb,0,          iconfigi,     cin[6]);
Mux2(hmbmb,0,          irefreshi,    cin[7]);
Mux2(hmbmb,mcadmacmd,  idmacmdi,     cin[8]);
Mux2(hmbmb,pre_stream, imcabursti,   cin[9]);
Mux2(hmbmb,1,          itcbi,        cin[10]);
Mux2(hmbmb,0,          SYNR,         cin[11]);
Mux2(hmbmb,0,          SYNT,         cin[12]);

Eregister(addren,cin,cout[12:0]);

/* Multiplexer for the Byte enable lines accessing from MCA and
   XACT bus. The external (not in FIFO) Byte enable register has
   to take the direct Byte enable info from the MCA, not the latched
   one which goes into the FIFO during write cycles!!
```

```
*/
Mux2(hmbmb,Mbebin[3:0], Xbebin[3:0],bebin[3:0]);
Mux2(hmbmb,Mbebnol[3:0],Xbebin[3:0],bebnol[3:0]);

/* The deco486b signal is a control flag for the FIFO write decoder.
   It is set active during a I486 burst read. Since the control flag
   register changes after a valid cmd from the XACT bus, the deco486b
   flag has to be set to the correct value immediatelly when a valid
   cmd is issued. Otherwise any new cycle right after a 486 burst read
   could go wrong.

NOTICE: The validallbi signal is used instead of the validbi. This
   is necessary to speed up the decoding process (xcsb problem).
   The only difference is that this flag changes, even if the SYNC
   block is not selected. Since in this application the SYNC block
   is the only one which receives an i486burst command, this should
   not be a problem. In future applications (more i486burst receivers)
   the validallbi signal could be logically connected with the busybo
   signal to ensure proper operation.
*/ deco486b = hmbmb & (!validallbi & i486bursti # validallbi & cout[3]);

/* The deco64 signal is also a control flag for the FIFO write decoder.
   It is set active during a I486 burst read if a 64 bit MCA device is
   available, or if a Busmaster read cycle occurs. In this case the
   data is always written to the FIFO in a 64bit fashion. For safety
   the first term is set to 0 until the Statemachine leaves the IDLE1
   state. This avoid an accidential deco64 generation during regular
   Hostmaster write modes. (There it would be critical)
*/ deco64   = hmbmb & sm64 & !SM_NEWC1
         # !hmbmb & !cout[1];

.BLOCK fifo f1

PRESET=pointer_res,FDINL=dinl,FDINH=dinh,FAIN=areg,FBEbIN=bebin,
FI486b=deco486b,DI64=deco64,FI64=sm64,FHmBmb=hmbmb,
wren=fifo_wren,rden=fifo_rden,SMwcclb=FC[0],SMswenb=stop_wrenb,
SMrcclb=FC[1],SMsrenb=stop_rdenb,FInewc2=SM_NEWC2,fIwrb=cout[1], FDOUTL=dfoutl,FDOUTH=douth,FBEbOUT=bebout,
fuh=lfull,Fempty=empty,emh=lempty,wc=wc,rc=rc,diff=diff,
PCLK=NPCLK;

.BLOCK sysm s1 xireset=xireset,hmbmb=hmbmb,SYNT_ADDR=SYNT_ADDR,SYNR_ADDR=SYNR_ADDR,
iconfigi=iconfigi,validallbi=validallbi,xcsb=xcsb,wrbi=wrbi,
i486bursti=i486bursti,xsp1=xsp1,xsp0=xsp0,sbusybi3c=sbusybi3c,
sbusybi=sbusybi,snextbi=snextbi,SM_gntb=SM_gntb,cout1=cout[1],
cout3=cout[3],cout7=cout[7],cout11=cout[11],cout12=cout[12],
xdest_busyb=xdest_busyb,s486=s486,sm64=sm64,wc=wc,rc=rc,empty=empty,
lempty=lempty,burstbi=burstbi,startbi=startbi,smcawr=smcawr,
``` nostream=nostream,pcrl=pcrl,diff=diff,done=done,mibcnt=mibcnt,
still_smode=still_smode,
NPCLK=NPCLK, SM_rden=SM_rden,SM_validbo=SM_validbo,SM_busybo=SM_busybo,SM_reqb=SM_reqb,
SM_burstbo=SM_burstbo,SM_startbo=SM_startbo,FC=FC,
SM_NEWC1=SM_NEWC1,SM_NEWC2=SM_NEWC2,SM_FLUSH1=SM_FLUSH1,SM_Mw1=SM_Mw1,
SM_Mw4=SM_Mw4,SM_Mw7=SM_Mw7,SM_Mrb4=SM_Mrb4,SM_Mrb5=SM_Mrb5,SM_Mrb7=SM_Mrb7;

/* The following circuit manipulates A2 and A3 for the Micro channel
   block during a I486 burst transfer; Notice: deco486b is also used
   here!
*/
manipulate = deco486b & validbo;
Mux2(manipulate,areg[3:2],wc[1:0],aout[3:2]);
aout[31:4] = areg[31:4]; /* This line is necessary to get around
                            an internal cdl compiler error !!!!!! */

/* If the SM is in the FLUSH1 or IDLE2 state, then reset
   the FIFO w/r pointers
*/
pointer_res = SM_FLUSH1 # SM_NEWC2;

/* These signals tell the arbitration logic in the MCA block that
   the SYNC block is in one of the IDLE conditions. Since the NEWC1
   and NEWC2 signals are outputs of a DECODER, they must be run through
   a FF to filter eventual glitches due to SM state changes. This avoids
   accidental changes from Hostmaster mode to Busmaster mode and vica
   versa.
   ATTENTION: Since both signals are derived from NEWC1 and NEWC2 it is
              NOT CLEAR why 2 identical signals are needed.
*/
.edge falling NPCLK;
oebro := SM_NEWC1 # SM_NEWC2;
oebwo := SM_NEWC1 # SM_NEWC2;
.edge rising NPCLK;

/* The gnt signal from the XACT bus is delayed by one clock cycle
   to ensure a proper SM function; This SM_gntb signal can also be
   used to control the output buffers to the XACT bus (validbo).
*/
SM_gntb := xgntb;

/* The input drivers from the XACT bus will be enabled only if a
   Chip select signal and a "valid all" signal is active.
*/
validbi = validallbi # xcsb;
burstbi = burstallbi # !hmbmb;

/* generate retry from xdest_busyb */ retrybo:= xdest_busyb;

```
/* The request is activated by SM_reqb if Hostmaster write modes. In
   Hostmaster regular read modes the request is produced from the start
   (valid) signal coming from the MCA. In busmaster modes the REQb is
   activated when a valid signal comes in from the MCA. The AND term
   with the NEWC2 variable avoids requests if the SM is not in IDLE2!!!
   The REQb is turned off if DEST_BUSYb is inactive and valid data is
   issued to the XACT bus. However in Busmaster streaming modes, the
   REQb must stay active when the first data transfer on the XACT bus
   is activated. The flag FC[4] avoids the inactivation of reqbo unless
   the burstbo is activated (Busmaster read and write modes).

During a hostmaster read cycle the data is written into the fifo
   with the snextbi command, the request is issued with the startbi cmd.
   This is not a sync. problem since the MCA block issues the MCNEXTb
   signal one MCLK cycle after it issues MCSTARTb. This makes sure that
   when valid data has to be issued on the XACT bus the data is already
   in the fifo.
*/ reqbo   =   SM_NEWC1
        #   SM_FLUSH1
        #   SM_reqb & hmbmb & cout[1]
        #   SM_reqb & hmbmb & cout[3]
        #   SM_reqb & startbi
        #   SM_reqb & !SM_NEWC2
        #   xdest_busyb & !SM_gntb & burstbo & FC[4];

/* The state machine generates a "valid" signal (SM_validbo)
   which allows the validbo signal to go active whenever
   SM_gntb goes active low.
   Since there is no SM_gntb in a I486 burst read cycle, that signal
   is masked out to let SM_validbo control the validbo signal.
   In a I486 burst read cycle the validbo signal is deactivated
   by the burstbi signal going inactive high.
   The fourth term controls validbo during busmaster stream write cycles.
   If the fifo is empty validbo goes inactive. If however only a single
   busmaster write cycle has to be done (SM==Mw7), then the validbo is
   controlled by SM_validbo. Reason: The empty line does not go low
   because the Fifo write pointer is locked during the first busmaster write.
*/
validbo =   SM_validbo
        #   SM_gntb & !cout[3]
        #   burstbi & cout[3]
        #   lempty & !hmbmb & cout[1] & !SM_Mw7;
            /* for BM burst write cyles */

/* The burstbo signal can only be turned off when it is absolutely sure
   that done from the MCA bus is active and the last write to the
   fifo has taken place. With the slow sync. the write to the fifo might
   occur one cycle too late. Hence lempty would still be true (1) and if
   done is active (1) now, then the burstbo signal is deactivated one
   cycle too early. The cout[1] term in the equation allows this part
   of the equation to become active just in Busmaster write modes.
*/
del_doneb   := !done;

still_smode := del_doneb # wren2;
```

```
burstbo = SM_burstbo # (!still_smode & lempty & cout[1]);

busybo =  SM_busybo
        # xdest_busyb & !SM_gntb
        # !(lfull # validbi # hmbmb);

/* The IRTNCMD is generated by the wrb control bit */
rtnc = !cout[1];
/* If busmaster in control, then IRTNCMD is always 0! */
Mux2(hmbmb,0,rtnc,irtncmdo);

/* Combinatorial logic which determines if page crossing can be allowed
   during a Busmaster stream read cycle. Also detect MIB crossing. If
   later on it turns out that the pagecr_ok signal is too late for the
   state machine, drive it through 1 FF to make it sync. to PCLK again.
   (It doesn't really matter to delay pagecr_ok1 by one cycle !!!)
*/
/* pagecr_ok1 = S33MHz & diffeg4 # S25MHz & diffeg5 # S20MHz & diffeg5; */

/* Long form : */
   pagecr_ok1 =   xsp1 &  xsp0 & diff[2]
              #  xsp1 & !xsp0 & diff[2] & (diff[0] # diff[1])
              # !xsp1 &  xsp0 & diff[2] & (diff[0] # diff[1]);

pcr1 :=  !pcr1 &  pagecr_ok1   /* set condition */
       #  pcr1 & !SM_NEWC2;    /* reset condition */

/* pagecr_ok = pagecr_ok1 # pcr1;  page crossing is ok now (used in SM) */ encr_count = SM_Mrb7 & validbi;
encr_res = !SM_NEWC2;

Ecounter(encr_count,encr_res,0,mibcnt[1:0]);

/*
MIB_cross = mibcnt[1] & mibcnt[0];    Tell the SM to allow aborting
                                      BM stream read if the MIB doesn't
                                      deliver data for MORE than 4
                                      PCLK cycles.
*/

/* A Busmaster streaming mode read cycle has to be terminated if the
   SM detects an interruption which is more than the one for a usual
   page crossing in the MIB. The streaming mode will also be aborted
   if the FIFO did not receive enough data to buffer a page crossing.
   The allowl term limits the abortb signal to 1 PCLK period.
   During busmaster streaming mode write cycles, the stream has to
   be terminated if the SM_gntb or the xdest_busyb is active too long
   so the FIFO might overflow.
*/
allowl := allowl & abortb # !allowl & SM_NEWC2;

abortb = !(FC[3] &  validbi     & !cout[1] & allowl
         # FC[3] & !xdest_busyb &  cout[1] & allowl
         # FC[3] &  SM_gntb     &  cout[1] & allowl);
```

```
/* MCASTREAM signal generation. This signal tells the XACT bus if a
   Busmaster streaming mode cylce has to be done. This signal is set
   active during busmaster read cycles (cout[9]) if NO_STREAM=0 (pre_stream)
   and during Busmaster write cycles if it turns out that the MCA device
   does a stream write. (Indicated by SM == Mw4).
*/
stream_wr :=  !stream_wr &  SM_Mw4
           #  stream_wr &  !SM_NEWC2;

stream_write = stream_wr # SM_Mw4;

sel_stream = !hmbmb & cout[1];
Mux2(sel_stream,cout[9],stream_write,MCASTREAM);

/* The stop_rdenb flag is set active 0 if a 64bit MCA device responds
   to a Hostmaster I486 burst read cycle. It is also set at the beginning
   of a Busmaster stream read cycle. This is necessary to lock the read
   pointer in the first position until the first read is done. If just
   the last term would be used, it could happen that the sm64 bit signal
   goes active before the first read was done. The Mrb4/Mrb5 terms in
   combination with rc[0] (first read not done if rc[0] = 0) ensures
   that the stop_rdenb signal stays 0 until rc[0]=1 !! The rc[0] signal
   has to be used, because the SM Mrb4/Mrb5 states might still be valid
   when the second read is started !!!
*/
stop_rdenb = !(hmbmb &  cout[3] & sm64
            # !hmbmb & !cout[1] & SM_Mrb4 & !rc[0]
            # !hmbmb & !cout[1] & SM_Mrb5 & !rc[0]
            # !hmbmb & !cout[1] & !sm64
            # !hmbmb &  cout[1] &  sm64);

stop_wrenb = !(!hmbmb & !cout[1]
            # !hmbmb &  cout[1] & SM_Mw1 & !wc[0]);

/* The signal wren1 is generated at the start of a Hostmaster write
   cycle except config cycles. The other equation is for Busmaster
   read cycles where a XACT slave writes a read return to the FIFO.
*/
wren1 = !validbi & wrbi & busybo & !SYNT
      # !hmbmb & !wrbi & !validbi & !lfull & irtncmdi;

/* The wren2 signal is generated whenever the MCA block writes into
   the fifo. This is done either by the inverted snextbi command
   (mca_access) or if the fifo is full and there is one more data
   set in the prestorage registers in a busmaster stream write cycle.
*/
allow_wrpre := !allow_wrpre & !snextbi & lfull & !hmbmb & cout[1]
            #  allow_wrpre & !write_prestorage;

wrpreQ1 := allow_wrpre & !lfull;
wrpreQ2 := wrpreQ1;

write_prestorage = wrpreQ1 & !wrpreQ2;

wren2 = mca_access & !lfull  #  write_prestorage;
```

```
fifo_wren =  !FC[2] & wren1  # FC[2] & wren2;

fifo_rden =  SM_rden & xdest_busyb & !validbo
            # !hmbmb & !cout[1] & mca_access;

/* External latches for address storage
*/
addren  =    hmbmb & !validbi & busybo
            # !hmbmb & !startbi & SM_NEWC2;   /* Enable for Control Eregister */
Laddren =    NPCLK # !addren;                  /* Latch enable for Address reg */

Latch(Laddren,ain[31:2],areg[31:2]);
Latch(Laddren,bebnol[3:0],beb[3:0]);
Buffer(cout[1],beb[3:0],bebout[3:0]);

.END;

/******************** Synchronizer state machine ********************/
/*.                    Date: 08/03/1990                             */
/*******************************************************************/

.INPUT  xireset,hmbmb,SYNT_ADDR,SYNR_ADDR,iconfigi,validallbi,xcsb,
        wrbi,i486bursti,xsp1,xsp0,sbusybi3c,sbusybi,snextbi,SM_gntb,
        cout1,cout3,cout7,cout11,cout12,xdest_busyb,s486,
        sm64,wc[2:0],rc[0],empty,lempty,burstbi,startbi,smcawr,
        nostream,pcrl,diff[2:0],done,mibcnt[1:0],still_smode;

.OUTPUT SM_rden,SM_validbo,SM_busybo,SM_reqb,SM_burstbo,SM_startbo,FC[4:0],
        SM_NEWC1,SM_NEWC2,SM_FLUSH1,SM_Mw1,SM_Mw4,SM_Mw7,
        SM_Mrb4,SM_Mrb5,SM_Mrb7;

.IFLEVEL TOP
.CLOCK NPCLK;
.edge rising NPCLK;
.ELSE
.INPUT NPCLK;
.ASSIGN NPCLK;
.edge rising NPCLK;
.ENDIF /* The state machine shown takes care of the XACT bus and MCA interface
   control as well as the FIFO control
*/

/* The FLUSH1 state initializes the Synchronizer and the FIFO block. The
   difference to IDLE1 state is that the FIFO write/read pointers are
   both reset with the pointer_res signal! (see below SM END directive)
*/

/* SM output:  rden validbo busybo reqb burstbo startbo  FC[4:0]  MAIN[5:0]*/
/*                                                       43210             */
.STATEDEF FLUSH1 0b,    1b,    0b,   1b,   1b,     1b,    00011b   20h;
```

```
/* The following definitions are for a Hostmaster write operation */

/* SM output:   rden  validbo busybo reqb burstbo startbo  FC[4:0]  MAIN[5:0]*/
/*                                                         43210             */
.STATEDEF IDLE1  0b,   1b,    1b,    1b,  1b,     1b,      10011b   00h;
.STATEDEF W1     0b,   1b,    0b,    1b,  1b,     0b,      10011b   01h;
.STATEDEF W2     0b,   1b,    0b,    1b,  1b,     1b,      10011b   02h;
.STATEDEF W3     0b,   1b,    1b,    1b,  1b,     1b,      10011b   03h;
.STATEDEF W4     0b,   1b,    1b,    1b,  1b,     1b,      10011b   04h;
.STATEDEF W5     0b,   1b,    1b,    1b,  1b,     1b,      10011b   05h;
.STATEDEF W6     0b,   1b,    0b,    1b,  1b,     0b,      10011b   06h;
.STATEDEF W7     0b,   1b,    0b,    1b,  1b,     1b,      10011b   07h;
.STATEDEF W8     0b,   1b,    0b,    1b,  1b,     1b,      10011b   08h;

/* The following definitions are for a Hostmaster read operation */

/* SM output:   rden  validbo busybo reqb burstbo startbo  FC[4:0]  MAIN[5:0]*/
/*                                                         43210             */
.STATEDEF R1     0b,   1b,    0b,    1b,  1b,     0b,      10111b   09h;
.STATEDEF R2     0b,   1b,    0b,    1b,  1b,     1b,      10111b   0Ah;
.STATEDEF R3     0b,   0b,    0b,    0b,  1b,     1b,      10111b   0Bh;

/* The following definitions are for a Hostmaster I486 read operation */

/* SM output:   rden  validbo busybo reqb burstbo startbo  FC[4:0]  MAIN[5:0]*/
/*                                                         43210             */
.STATEDEF Rb1    0b,   1b,    0b,    1b,  1b,     0b,      10100b   0Ch;
.STATEDEF Rb2    0b,   1b,    0b,    1b,  1b,     1b,      10111b   0Dh;
.STATEDEF Rb3    1b,   0b,    0b,    1b,  1b,     1b,      10111b   0Eh;
.STATEDEF Rb4    0b,   1b,    0b,    1b,  1b,     1b,      10111b   0Fh;
.STATEDEF Rb5    0b,   1b,    0b,    1b,  1b,     1b,      10111b   10h;
.STATEDEF Rb6    0b,   1b,    0b,    1b,  1b,     1b,      10111b   11h;
.STATEDEF Rb7    0b,   1b,    0b,    1b,  1b,     0b,      10111b   12h;
.STATEDEF Rb8    0b,   1b,    0b,    1b,  1b,     1b,      10111b   13h;

/* The following definitions are for Busmaster stream read cycles */

/* SM output:   rden  validbo busybo reqb burstbo startbo  FC[4:0]  MAIN[5:0]*/
/*                                                         43210             */
.STATEDEF IDLE2  0b,   1b,    1b,    1b,  1b,     1b,      10100b   14h;
.STATEDEF Mr1    0b,   0b,    1b,    0b,  1b,     1b,      10011b   15h;
.STATEDEF Mr2    0b,   1b,    0b,    1b,  1b,     1b,      10011b   16h;
.STATEDEF Mr3    0b,   1b,    1b,    1b,  1b,     0b,      10011b   17h;
.STATEDEF Mr4    0b,   1b,    1b,    1b,  1b,     1b,      10011b   18h;
.STATEDEF Mrb1   0b,   0b,    1b,    0b,  1b,     1b,      00011b   19h;
.STATEDEF Mrb2   0b,   1b,    0b,    0b,  1b,     1b,      10011b   1Ah;
.STATEDEF Mrb3   0b,   1b,    0b,    0b,  0b,     1b,      10011b   1Bh;
.STATEDEF Mrb4   0b,   1b,    0b,    0b,  0b,     0b,      11011b   1Ch;
.STATEDEF Mrb5   0b,   1b,    0b,    0b,  0b,     0b,      10011b   1Dh;
.STATEDEF Mrb6   0b,   1b,    0b,    0b,  0b,     1b,      10011b   1Eh;
.STATEDEF Mrb7   0b,   1b,    0b,    0b,  0b,     1b,      10011b   1Fh;
.STATEDEF Mrb8   0b,   1b,    0b,    0b,  0b,     1b,      11011b   21h;
.STATEDEF Mrb9   0b,   1b,    0b,    0b,  0b,     1b,      11011b   22h;
.STATEDEF Mrb10  0b,   1b,    0b,    0b,  0b,     1b,      10011b   23h;

/* The following definitions are for Busmaster write cycles */
```

```
/* SM output:  rden  validbo busybo reqb burstbo  startbo   FC[4:0]  MAIN[5:0]*/
/*                                                          43210            */
.STATEDEF Mw1    0b,    1b,    1b,    0b,    1b,     1b,    00111b    24h;
.STATEDEF Mw2    0b,    1b,    1b,    0b,    1b,     1b,    00111b    25h;
.STATEDEF Mw3    0b,    1b,    1b,    0b,    1b,     1b,    00111b    26h;
.STATEDEF Mw4    1b,    0b,    1b,    0b,    1b,     1b,    00111b    27h;
.STATEDEF Mw5    1b,    0b,    1b,    0b,    0b,     1b,    10111b    28h;
.STATEDEF Mw6    1b,    0b,    1b,    0b,    0b,     1b,    11111b    29h;
.STATEDEF Mw7    1b,    0b,    1b,    0b,    1b,     1b,    10111b    2Ah;
.STATEDEF Mw8    1b,    0b,    1b,    0b,    1b,     1b,    01111b    2Bh;

.STATEMACHINE SM[5:0];
.SMEXTEND     SM_rden,SM_validbo,SM_busybo,SM_reqb,SM_burstbo,SM_startbo,
              FC[4:0];
.DEFAULT      FLUSH1;
.RESET        xireset  1  FLUSH1;

/* The following lines show the flow graph of the Initialization
   loop during a reset state, FLUSH1 and FLUSH2 state.
*/

.STATE FLUSH1:
        GOTO IDLE1;

/* The following lines show the flow graph of the Hostmaster write
   operation.
*/

.STATE IDLE1:
   IF (!hmbmb) THEN IDLE2
   ELSE
   IF (SYNT_ADDR & wrbi & iconfigi & !(validallbi # xcsb))
   THEN IDLE1 /* Later self test */
   ELSE
   IF (SYNR_ADDR & !wrbi & iconfigi & !(validallbi # xcsb))
   THEN R3
   ELSE
   IF (!(validallbi # xcsb) &  wrbi) THEN W1
   ELSE
   IF (!(validallbi # xcsb) & !wrbi & !i486bursti) THEN R1
   ELSE
   IF (!(validallbi # xcsb) & !wrbi &  i486bursti) THEN Rb1
   ELSE IDLE1;

.STATE W1:
        GOTO W2;

.STATE W2:
        GOTO W3;

.STATE W3:
    IF ((SYNR_ADDR & !wrbi & iconfigi & !(validallbi # xcsb)
      # SYNT_ADDR &  wrbi & iconfigi & !(validallbi # xcsb))
      & (xsp1 & xsp0 # xsp1 & !xsp0))
    THEN W7
    ELSE
    IF (SYNR_ADDR & !wrbi & iconfigi & !(validallbi # xcsb)
```

```
    # SYNT_ADDR &  wrbi & iconfigi & !(validallbi # xcsb))
  THEN W8
  ELSE
  IF (!(validallbi # xcsb) & (xsp1 & xsp0 # xsp1 & !xsp0))
  THEN W7
  ELSE
  IF (!(validallbi # xcsb))
  THEN W6
  ELSE
  IF ((validallbi # xcsb) & (xsp1 & xsp0 # xsp1 & !xsp0))
  THEN W4
  ELSE W5;

.STATE W4:
  IF (SYNR_ADDR & !wrbi & iconfigi & !(validallbi # xcsb)
    # SYNT_ADDR &  wrbi & iconfigi & !(validallbi # xcsb))
  THEN W8
  ELSE IF (!(validallbi # xcsb))
  THEN W6
  ELSE W5;

.STATE W5:
  IF (SYNR_ADDR & !wrbi & iconfigi & !(validallbi # xcsb)
    # SYNT_ADDR &  wrbi & iconfigi & !(validallbi # xcsb))
  THEN W8
  ELSE
  IF (!(validallbi # xcsb))
  THEN W6
  ELSE
  IF (!sbusybi3c)
  THEN W5
  ELSE IDLE1;

.STATE W6:
       IF (!sbusybi3c) THEN W6
         ELSE IF (cout1) THEN W2            /* another write  */
         ELSE IF (!cout1 & !cout3) THEN R1  /* regular read   */
         ELSE Rb1;                          /* I486 burst read */

.STATE W7:
        IF (cout11 # cout12) THEN W8   /* SYNR or SYNT flag true */
          ELSE W6;

.STATE W8:
        IF (!sbusybi3c) THEN W8
          ELSE IF (cout11) THEN R3
          ELSE IDLE1; /* IN this case cout[12] is true (SYNT)
                       --> later Selftest */

/* The following lines show the flow graph of the Hostmaster read
   operation.
*/

.STATE R1:
       GOTO R2;

.STATE R2:
```

```
          IF (snextbi) THEN R2
            ELSE IF (cout7) THEN IDLE1
            ELSE R3;

.STATE R3:
          IF (SM_gntb # !xdest_busyb) THEN R3
            ELSE IDLE1;

/* The following lines show the flow graph of the Hostmaster I486
   burst read operation.
*/

.STATE Rb1:
        GOTO Rb2;

.STATE Rb2:
        IF (snextbi) THEN Rb2
           ELSE IF ( s486 &  sm64) THEN Rb4
           ELSE IF ( s486 & !sm64) THEN Rb5
           ELSE IF (!s486 & !wc[0] & !wc[1]) THEN Rb3
           ELSE Rb8;

.STATE Rb3:
        IF (empty # burstbi) THEN FLUSH1
          ELSE Rb3;

.STATE Rb4:
        IF (!(!wc[0] & wc[1])) THEN Rb4
          ELSE Rb3;

.STATE Rb5:
        IF (!sbusybi) THEN Rb6
           ELSE IF (!(!wc[0] & !wc[1])) THEN Rb5
           ELSE Rb3;

.STATE Rb6:
        IF (!sbusybi) THEN Rb6
          ELSE Rb7;

.STATE Rb7:
        GOTO Rb2;

.STATE Rb8:
        GOTO Rb7;

/* The following lines show the flow graph for Busmaster read cylces */

.STATE IDLE2:
        IF (hmbmb) THEN IDLE1
          ELSE IF (!startbi & !smcawr & nostream) THEN Mr1
          ELSE IF (!startbi & !smcawr) THEN Mrb1
          ELSE IF (!startbi &  smcawr) THEN Mw1
          ELSE IDLE2;

.STATE Mr1:
```

```
        IF (SM_gntb # !xdest_busyb) THEN Mr1
           ELSE Mr2;

.STATE Mr2:
        IF ((validallbi # xcsb)) THEN Mr2
           ELSE Mr3;

.STATE Mr3:
        GOTO Mr4;

.STATE Mr4:
        IF (!rc[0]) THEN Mr4
           ELSE IDLE2;

.STATE Mrb1:
        IF (SM_gntb # !xdest_busyb) THEN Mrb1
           ELSE Mrb2;

.STATE Mrb2:
        IF ((validallbi # xcsb)) THEN Mrb2
           ELSE Mrb3;

.STATE Mrb3:
   IF (!(!wc[2] & wc[1] & !wc[0]) # (validallbi # xcsb))
   THEN Mrb3
   ELSE Mrb4;

.STATE Mrb4:
   IF ((pcrl
       # xsp1 &  xsp0 & diff[2]
       # xsp1 & !xsp0 & diff[2] & (diff[0] # diff[1])
       # !xsp1 &  xsp0 & diff[2] & (diff[0] # diff[1]))
       & !rc[0])
   THEN Mrb5
   ELSE
   IF ((pcrl
       # xsp1 &  xsp0 & diff[2]
       # xsp1 & !xsp0 & diff[2] & (diff[0] # diff[1])
       # !xsp1 &  xsp0 & diff[2] & (diff[0] # diff[1]))
       & rc[0])
   THEN Mrb6
   ELSE
   IF (!(pcrl
       # xsp1 &  xsp0 & diff[2]
       # xsp1 & !xsp0 & diff[2] & (diff[0] # diff[1])
       # !xsp1 &  xsp0 & diff[2] & (diff[0] # diff[1]))
       & rc[0])
   THEN Mrb9
   ELSE Mrb4;

.STATE Mrb5:
        IF (!rc[0]) THEN Mrb5
           ELSE Mrb6;

.STATE Mrb6:
        IF (!done & !(validallbi # xcsb)) THEN Mrb6
           ELSE IF (!done & (validallbi # xcsb)) THEN Mrb7
           ELSE IDLE2;
```

```
.STATE Mrb7:
        IF (done) THEN IDLE2
        ELSE
        IF (!mibcnt[1] & mibcnt[0] & (validallbi # xcsb))
        THEN Mrb7
        ELSE
        IF ( mibcnt[1] & mibcnt[0] & (validallbi # xcsb)
          & (sm64 &  diff[2]
          # !sm64 & (diff[2] # diff[0] & diff[1])))
        THEN Mrb10
        ELSE Mrb8;

.STATE Mrb8:
        IF (!done) THEN Mrb8
          ELSE IDLE2;

.STATE Mrb9:
    IF (done) THEN IDLE2
    ELSE
    IF ( pcrl
       # xsp1 &  xsp0 & diff[2]
       # xsp1 & !xsp0 & diff[2] & (diff[0] # diff[1])
       # !xsp1 &  xsp0 & diff[2] & (diff[0] # diff[1])
       # !sm64)
    THEN Mrb6
          ELSE Mrb9;

.STATE Mrb10:
    IF (done) THEN IDLE2
    ELSE
    IF ((validallbi # xcsb)
       & (sm64 &  diff[2]
       # !sm64 & (diff[2] # diff[0] & diff[1])))
    THEN Mrb10
    ELSE Mrb8;

/* The following lines show the flow graph for a Busmaster write cylce */

.STATE Mw1:
        IF (!wc[0]) THEN Mw1
          ELSE IF (done # nostream) THEN Mw7
          ELSE Mw2;

.STATE Mw2:
        IF (!done & !wc[1]) THEN Mw2
          ELSE IF (done & wc[0] & !sm64) THEN Mw7
          ELSE IF (wc[1] & sm64) THEN Mw4
          ELSE Mw3;

.STATE Mw3:
        IF (!done & !(wc[1] & wc[0])) THEN Mw3
          ELSE IF (done & wc[1] & !wc[0] & !sm64) THEN Mw7
          ELSE Mw4;

.STATE Mw4:
        IF (diff[2] & (diff[0] # diff[1])
          & (SM_gntb # !xdest_busyb))
```

```
            THEN Mw8
            ELSE
            IF (diff[2] & (diff[0] # diff[1])) THEN Mw6
            ELSE
            IF (SM_gntb # !xdest_busyb) THEN Mw4
            ELSE Mw5;

.STATE Mw5:
            IF (!done & !xdest_busyb & diff[2] & (diff[0] # diff[1]))
            THEN Mw6
            ELSE
            IF (still_smode # !lempty) THEN Mw5
            ELSE IDLE2;

.STATE Mw6:
            GOTO Mw5;

.STATE Mw7:
            IF (SM_gntb # !xdest_busyb) THEN Mw7
              ELSE IDLE2;

.STATE Mw8:
            IF (SM_gntb # !xdest_busyb) THEN Mw8
              ELSE Mw5;

.ENDSTATEMACHINE;

SM_NEWC1  = (SM == IDLE1);
SM_NEWC2  = (SM == IDLE2);
SM_FLUSH1 = (SM == FLUSH1);
SM_Mw1    = (SM == Mw1);
SM_Mw4    = (SM == Mw4);
SM_Mw7    = (SM == Mw7);
SM_Mrb4   = (SM == Mrb4);
SM_Mrb5   = (SM == Mrb5);
SM_Mrb7   = (SM == Mrb7);

.END;

/************************* Synchronizer FIFO ****************************/
/*                          08/03/1990                                  */

.INPUT PRESET,
       FDINL[31:0],FDINH[31:0],FAIN[3:2],FBEbIN[3:0],FI486b,DI64,FI64,
       FHmBmb,wren,rden,SMwcclb,SMswenb,SMrcclb,SMsrenb,FInewc2,FIwrb;

.OUTPUT FDOUTL[31..0],FDOUTH[31..0],FBEbOUT[3:0],fuh,Fempty,emh,
        wc[2:0],rc[0],diff[2:0];

.MODEL;
.PULLUP FDOUTL=0xFFFFFFFF;
.PULLUP FBEbOUT=0xF;
.ENDMODEL;

.IFLEVEL TOP
.CLOCK PCLK;
.edge rising PCLK;
```

```
.ELSE
.INPUT PCLK;
.ASSIGN PCLK;
.edge rising PCLK;
.ENDIF

Buffer(BUFLH, FDINL,DLin);
Buffer(BUFLHb,FDINH,DLin);

Buffer(BUFLH, FDINH,DHin);
Buffer(BUFLHb,FDINL,DHin);

Latch(WEL[0],DLin,D0Lout);
Latch(WEL[1],DLin,D1Lout);
Latch(WEL[2],DLin,D2Lout);
Latch(WEL[3],DLin,D3Lout);
Latch(WEL[4],DLin,D4Lout);
Latch(WEL[5],DLin,D5Lout);
Latch(WEL[6],DLin,D6Lout);
Latch(WEL[7],DLin,D7Lout);

Latch(WEH[0],DHin,D0Hout);
Latch(WEH[1],DHin,D1Hout);
Latch(WEH[2],DHin,D2Hout);
Latch(WEH[3],DHin,D3Hout);
Latch(WEH[4],DHin,D4Hout);
Latch(WEH[5],DHin,D5Hout);
Latch(WEH[6],DHin,D6Hout);
Latch(WEH[7],DHin,D7Hout);

Buffer(REL[0],D0Lout,FDOUTL);
Buffer(REL[1],D1Lout,FDOUTL);
Buffer(REL[2],D2Lout,FDOUTL);
Buffer(REL[3],D3Lout,FDOUTL);
Buffer(REL[4],D4Lout,FDOUTL);
Buffer(REL[5],D5Lout,FDOUTL);
Buffer(REL[6],D6Lout,FDOUTL);
Buffer(REL[7],D7Lout,FDOUTL);

Buffer(REH[0],D0Hout,FDOUTH);
Buffer(REH[1],D1Hout,FDOUTH);
Buffer(REH[2],D2Hout,FDOUTH);
Buffer(REH[3],D3Hout,FDOUTH);
Buffer(REH[4],D4Hout,FDOUTH);
Buffer(REH[5],D5Hout,FDOUTH);
Buffer(REH[6],D6Hout,FDOUTH);
Buffer(REH[7],D7Hout,FDOUTH);

Latch(WEL[0],FBEbIN,BEb0out);
Latch(WEL[1],FBEbIN,BEb1out);
Latch(WEL[2],FBEbIN,BEb2out);
Latch(WEL[3],FBEbIN,BEb3out);
Latch(WEL[4],FBEbIN,BEb4out);
Latch(WEL[5],FBEbIN,BEb5out);
Latch(WEL[6],FBEbIN,BEb6out);
Latch(WEL[7],FBEbIN,BEb7out);
```

```
RELbe0 = REL[0] & REH[0]   # !FIwrb;
RELbe1 = REL[1] & REH[1]   # !FIwrb;
RELbe2 = REL[2] & REH[2]   # !FIwrb;
RELbe3 = REL[3] & REH[3]   # !FIwrb;
RELbe4 = REL[4] & REH[4]   # !FIwrb;
RELbe5 = REL[5] & REH[5]   # !FIwrb;
RELbe6 = REL[6] & REH[6]   # !FIwrb;
RELbe7 = REL[7] & REH[7]   # !FIwrb;

Buffer(RELbe0,BEb0out,FBEbOUT);
Buffer(RELbe1,BEb1out,FBEbOUT);
Buffer(RELbe2,BEb2out,FBEbOUT);
Buffer(RELbe3,BEb3out,FBEbOUT);
Buffer(RELbe4,BEb4out,FBEbOUT);
Buffer(RELbe5,BEb5out,FBEbOUT);
Buffer(RELbe6,BEb6out,FBEbOUT);
Buffer(RELbe7,BEb7out,FBEbOUT);

/* Enable pass buffer if second address is valid during a 64 to
   32 bit transfer from MCA to XACT. Hence SMrenb = 0 and rc[0] = 1.
   (passhb is low active)
*/
passhb = SMsrenb # !rc[0];
Buffer(passhb,FDOUTH,FDOUTL);

wren_new = wren & !(FHmBmb & !FI486b); /* avoid fifo writes during
                                          regular Hm. reads or writes */
Ecounter(wren_new,SMwcclb,0,wc[2..0]);
stopwb = SMswenb # wc[0];
wcen   = stopwb & wren_new;
wcld   = !PRESET;
Ecounter(wcen,wcld,0,WA[2..0]);
Ecounter(wcen,wcld,1,WAinc[2..0]);

/* Limit the write enable to the FIFO to the low clock phase. During
   this time the selected latch will be open. The data are latched
   in the selected Latch with the rising edge of PCLK.
*/

Dwren = !(PCLK # !wren);

.BLOCK decow  d1

A2=FAIN[2],A3=FAIN[3],S64=DI64,DI486b=FI486b,WRb=FIwrb,HmBmb=FHmBmb,
WA0=WA[0],WA1=WA[1],WA2=WA[2],wc0=wc[0],Dwren=Dwren,
WEL[7..0]=WEL[7..0],WEH[7..0]=WEH[7..0],BUFLH=BUFLH,BUFLHb=BUFLHb;

/* The allow_up2 command is active only after the first Busmaster
   read operation. It will be inactive as soon as the second read
   cycle from the FIFO executed.
   The jump2 command is active only if the allow_up2 cmd is active
   and a Busmaster 64bit read has to be done. It is active just after
   the first read (rc[0] = 1) and the second read. When the second
   read is done, then allow_up2 is deactivated (rc[1] = 1).
   In Busmaster write cycles the allow_up2 signal is always inactive.
*/ up2 := FInewc2 # allow_up2;
```

```
allow_up2 = up2 & !FHmBmb & !FIwrb & !(rc[1]);
jump2 = allow_up2 & rc[0] & FI64;

Ecounter(rden,SMrcclb,0,rc[1..0]);
stoprb = SMsrenb # rc[0];
rcen  = stoprb & rden;
rcld  = !PRESET;
Ecounter2(rcen,rcld,jump2,0,RA[2..0]);
Ecounter2(rcen,rcld,jump2,1,RAinc[2..0]);

.BLOCK decor  d2

RA0=RA[0],RA1=RA[1],RA2=RA[2],srenb=SMsrenb,rc0=rc[0],jump2=jump2,
REL[7..0]=REL[7..0],REH[7..0]=REH[7..0];

Comparator(WAinc[2..0],RA,wequalb);
wequal = !wequalb;
frd = !(rden & stoprb);
fu  = wequal & wren_new & frd & stopwb;
fuh :=  fu  & !PRESET
      # fuh & !PRESET & frd;
Ffull = fu # fuh;

Comparator(RAinc[2..0],WA,requalb);
requal = !requalb;
fwr = !(wren_new & stopwb);
em  = (requal & rden & fwr & stoprb) # PRESET;
emh :=  em
      # emh & fwr;
Fempty = em # emh;

/* This logic delivers the difference between the write and the read
   pointer value. In a 64 bit busmaster read cycle it is allowed to
   cross a page in the MIB chip without interrupting the streaming
   mode if diff >= 4 (33MHz) or diff >= 5 (25MHz).
*/
Mux2(jump2,RA,RAinc,RAnew[2:0]);

/* Fast 3 bit subtractor for write/read pointer location difference */
.block sub3 sb1

A=WA,B=RAnew,
F=diff;

.end;

/*                          07/24/1990                              */

/* This decoder controls the entire FIFO write operations */

/*
Input listing:     A2,A3:    Address bits;
                   S64:      64/32 bits;
                   DI486b:   I486 burst signal;
                   WRb:      write/readb;
```

```
                HmBmb:      Hostmaster/Busmaster;
                WA0-2:      write pointer output;
                wc0-1:      write cycle number;
                wren:       combinatorial write enable for the FIFO
                            registers;
*/
.INPUT   A2,A3,S64,DI486b,WRb,HmBmb,WA0,WA1,WA2,wc0,Dwren;

/*
Output listing: WEL0-L7:    Write enable low;
                WEH0-H7:    Write enable high;
                BUFLH:      Fifo data input buffer control;
*/
.OUTPUT  WEL[7..0],WEH[7..0],BUFLH,BUFLHb;

/*
The FIFO is eight enties deep. The write pointer generates the base entry
number for addressing one of the 8 FIFO locations. The decoder produces
an offset to that base address.
*/
w0  =      !WA2 &  !WA1 &  !WA0;
w1  =      !WA2 &  !WA1 &   WA0;
w2  =      !WA2 &   WA1 &  !WA0;
w3  =      !WA2 &   WA1 &   WA0;
w4  =       WA2 &  !WA1 &  !WA0;
w5  =       WA2 &  !WA1 &   WA0;
w6  =       WA2 &   WA1 &  !WA0;
w7  =       WA2 &   WA1 &   WA0;

/*
During a I486 burst read cycle we can have 8 different modes depending
on the I486 start address and the data depth the microchannel device
can provide.
Notation examples: I486B64S8: 64 bit Microchannel device, I486 burst
                   starting address is "8 hex".
*/
I486B64S0  =    !A3 &  !A2 &   S64 & DI486b;
I486B64S4  =    !A3 &   A2 &   S64 & DI486b;
I486B64S8  =     A3 &  !A2 &   S64 & DI486b;
I486B64SC  =     A3 &   A2 &   S64 & DI486b;

I486B32S0  =    !A3 &  !A2 &  !S64 & DI486b;
I486B32S4  =    !A3 &   A2 &  !S64 & DI486b;
I486B32S8  =     A3 &  !A2 &  !S64 & DI486b;
I486B32SC  =     A3 &   A2 &  !S64 & DI486b;

/*
The next logic combination shows the decoder that a
Busmaster read transfer has to be done. The newest version
reads data in a 64 bit fashion from the XACT bus into the FIFO by
default!
*/
BmRB64  =          !WRb & !HmBmb;

/*
All other FIFO addressing modes are equal for either hostmaster
``` or busmaster access. I.e. the regular hostmaster writes work the
same as a Busmaster 64 bit write because the lower and upper data
register are written at the same time. Advantage: The deco64 (S64)
signal doesn't need to be set to a 1 if in BmWB64 !!!!
*/
HmBmWRb =       !S64 & !DI486b;

/*
The following combinatorial equations, "ANDed" with the write pointer
value, determine when the decoder outputs should be activated.
*/ cmb0 =      I486B64S0 # I486B64S4 # I486B32S0 # BmRB64 & !wc0 # HmBmWRb;

cmb1 =      I486B64S8 # I486B64SC # I486B32S4;

cmb2 =      I486B32S8;

cmb3 =      I486B32SC;

cmb4 =      I486B64S0 # I486B64S4 # BmRB64 & wc0 # HmBmWRb;

cmb5 =      I486B64S8 # I486B64SC;

WEL[0]  =  !(Dwren &  (w0 & cmb0 # w1 & cmb1 # w2 & cmb2 # w3 & cmb3));
WEL[1]  =  !(Dwren &  (w0 & cmb1 # w1 & cmb0 # w2 & cmb3 # w3 & cmb2));
WEL[2]  =  !(Dwren &  (w0 & cmb2 # w1 & cmb3 # w2 & cmb0 # w3 & cmb1));
WEL[3]  =  !(Dwren &  (w0 & cmb3 # w1 & cmb2 # w2 & cmb1 # w3 & cmb0));
WEL[4]  =  !(Dwren &   w4 & cmb0);
WEL[5]  =  !(Dwren &   w5 & cmb0);
WEL[6]  =  !(Dwren &   w6 & cmb0);
WEL[7]  =  !(Dwren &   w7 & cmb0);

WEH[0]  =  !(Dwren &  (w0 & cmb4 # w1 & cmb5));
WEH[1]  =  !(Dwren &  (w0 & cmb5 # w1 & cmb4));
WEH[2]  =  !(Dwren &   w2 & cmb4);
WEH[3]  =  !(Dwren &   w3 & cmb4);
WEH[4]  =  !(Dwren &   w4 & cmb4);
WEH[5]  =  !(Dwren &   w5 & cmb4);
WEH[6]  =  !(Dwren &   w6 & cmb4);
WEH[7]  =  !(Dwren &   w7 & cmb4);

BUFLH  = I486B64S4 # I486B64SC # BmRB64 & wc0;
BUFLHb = !BUFLH;

.end;

/* This decoder controls the entire FIFO read operation */
/*                      07/16/1990                      */
/*
Input listing:  RA0-2:      read pointer output;
                Stoprb:     control gating of the DOH data to the
                            DOL data bus. If Stoprb is active (0),
                            then the read pointer is locked to the

```
                                    same register location, but the DOH data
                                    word has to be transfered to the DOL bus;
*/
.INPUT    RA0,RA1,RA2,srenb,rc0,jump2;

/*
Output listing:  RE0L-4H:  Read enable bits;
*/
.OUTPUT   REL[7..0],REH[7..0];

/* Dissable the lower partition of the data registers if the "high"
   32 bit word should be passed on the DOUTL bus.
   Condition: SMrenb = 0 and rc[0] = 0)
   The REL[1] output will be enabled (jump2 = 1) if in a Busmaster
   burst read cycle it turns out to be a 64 bit MCA device. At the
   same time REL[0] will be dissabled because the read pointer still
   points to location 0 !!!!
*/

REL[0]  =    RA2 #  RA1 #  RA0 # !srenb & rc0  #  jump2;
REL[1]  =   (RA2 #  RA1 # !RA0 # !srenb & rc0) & !jump2;
REL[2]  =    RA2 # !RA1 #  RA0 # !srenb & rc0;
REL[3]  =    RA2 # !RA1 # !RA0 # !srenb & rc0;
REL[4]  =   !RA2 #  RA1 #  RA0 # !srenb & rc0;
REL[5]  =   !RA2 #  RA1 # !RA0 # !srenb & rc0;
REL[6]  =   !RA2 # !RA1 #  RA0 # !srenb & rc0;
REL[7]  =   !RA2 # !RA1 # !RA0 # !srenb & rc0;

REH[0]  =    RA2 #  RA1 #  RA0 #  jump2;
REH[1]  =   (RA2 #  RA1 # !RA0) & !jump2;
REH[2]  =    RA2 # !RA1 #  RA0;
REH[3]  =    RA2 # !RA1 # !RA0;
REH[4]  =   !RA2 #  RA1 #  RA0;
REH[5]  =   !RA2 #  RA1 # !RA0;
REH[6]  =   !RA2 # !RA1 #  RA0;
REH[7]  =   !RA2 # !RA1 # !RA0;

.end;

/***********   Fast 3 bit subtractor without carry in/out   *************/
/*-                        08/03/90                                    */

.INPUT      A[2:0],B[2:0];
.OUTPUT     F[2:0];

F[0] = A[0] & !B[0] # !A[0] & B[0];

F[1] =    A[1] & !B[1] &  TS14 #  A[1] & B[1] & !TS14
       # !A[1] & !B[1] & !TS14 # !A[1] & B[1] &  TS14;

TS14 = A[0] # !B[0];

F[2] =    A[2] & !B[2] &  TS25 #  A[2] & B[2] & !TS25
       # !A[2] & !B[2] & !TS25 # !A[2] & B[2] &  TS25;

TS25 =    (A[1] # !B[1])
       & (A[0] # !B[0] #  A[1])
       & (A[0] # !B[0] # !B[1]);

.END;
```

What is claimed is:

1. A work station comprising:
a local bus connected to a CPU; and
an interface chip connected between an external bus and said local bus, said buses having different operating frequencies, including:
a DMA unit for controlling data transfer between said external and local buses within a single DMA Cycle;
an internal bus;
a first interfacing unit, connected between said external and internal buses, including a synchronizer for compensating for the different operating frequencies during said data transfer between said external and local buses within said DMA cycle; and
an internal arbiter for granting either said DMA or interfacing unit access to said internal bus;
wherein said internal bus connects said DMA unit, interfacing unit and internal arbiter.

2. A work station according to claim 1, wherein said chip further includes a second interfacing unit connected between said internal and local buses.

3. A work station according to claim 2, wherein said second interfacing unit includes said internal arbiter for granting said DMA or interfacing units access to said internal bus according to respectively assigned priorities.

4. A work station according to claim 3, wherein said internal bus includes lines for enabling each of said DMA and interfacing units to transmit a bus request signal and a unit identification signal to said arbiter and to receive a bus access grant signal from said arbiter.

5. A work station according to claim 2, wherein said internal bus includes lines for presenting, in parallel, address signals, data signals, unit identification signals, and command signals from one of said units to at least another one of said units.

6. A work station according to claim 5, wherein said internal bus further includes a BUSY line for each of said units for indicating whether it is busy.

7. A work station according to claim 1 wherein said external bus is a Micro Channel bus.

8. A work station according to claim 7, further comprising:

a main memory connected to said local bus;
wherein said DMA unit controls data transfer between said Micro Channel bus and said memory.

9. A work station according to claim 1, wherein said interface chip is provided with connecting pins for connection with assigned lines of said host bus.

10. A work station comprising:
a local bus connected to a CPU and main memory; and
an interface chip connected between a Micro Channel bus and said local bus, said buses having different operating frequencies, including:
an internal bus;
a DMA unit, connected to said internal bus, for controlling data transfer between said Micro Channel and local buses within a single DMA cycle;
a first interfacing unit, connected between said Micro Channel and internal buses, including a synchronizer for compensating for the different operating frequencies during said data transfer between said external and local buses within said DMA cycle; and
a second interfacing unit, connected between said internal and local buses, including an internal arbiter for granting said DMA or interfacing units access to said internal bus;
wherein each of said DMA and interfacing units is assigned a priority, and wherein said internal arbiter grants access to said internal transaction bus according to said assigned priorities.

11. A work station according to claim 10, wherein said internal bus includes:
lines for enabling each of said DMA and interfacing units to transmit a bus request signal and a unit identification signal to said arbiter and to receive a bus access grant signal from said arbiter;
lines for presenting, in parallel, address signals, data signals, unit identification signals, and command signals from one of said units to at least another one of said units; and
a BUSY line for each of said units for indicating whether it is busy.

* * * * *